US012393141B2

(12) United States Patent
Shiodera et al.

(10) Patent No.: US 12,393,141 B2
(45) Date of Patent: Aug. 19, 2025

(54) FIXING DEVICE AND IMAGE FORMING APPARATUS

(71) Applicants: Kota Shiodera, Tokyo (JP); Takayuki Andoh, Kanagawa (JP); Masahiro Samei, Kanagawa (JP); Toshiyuki Kabata, Kanagawa (JP); Hiroshi Yoshinaga, Chiba (JP)

(72) Inventors: Kota Shiodera, Tokyo (JP); Takayuki Andoh, Kanagawa (JP); Masahiro Samei, Kanagawa (JP); Toshiyuki Kabata, Kanagawa (JP); Hiroshi Yoshinaga, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 15 days.

(21) Appl. No.: 18/180,509

(22) Filed: Mar. 8, 2023

(65) Prior Publication Data

US 2023/0297011 A1 Sep. 21, 2023

(30) Foreign Application Priority Data

Mar. 18, 2022 (JP) ................................ 2022-043345
Sep. 26, 2022 (JP) ................................ 2022-152687

(51) Int. Cl.
*G03G 15/20* (2006.01)

(52) U.S. Cl.
CPC ................................ *G03G 15/2025* (2013.01)

(58) Field of Classification Search
CPC ................................................ G03G 15/2025
See application file for complete search history.

(56) References Cited

U.S. PATENT DOCUMENTS

| | | | |
|---|---|---|---|
| 2007/0196152 A1 | 8/2007 | Shimizu et al. |
| 2011/0044734 A1 | 2/2011 | Shimokawa et al. |
| 2011/0052245 A1 | 3/2011 | Shinshi et al. |
| 2011/0064437 A1 | 3/2011 | Yamashina et al. |

(Continued)

FOREIGN PATENT DOCUMENTS

| | | |
|---|---|---|
| JP | 2014-178405 | 9/2014 |
| JP | 2016-070946 | 5/2016 |

OTHER PUBLICATIONS

Extended European Search Report, dated Jun. 29, 2023, issued in corresponding European Patent Application No. 23160995.9.

(Continued)

*Primary Examiner* — Carla J Therrien
(74) *Attorney, Agent, or Firm* — Harness, Dickey & Pierce, P.L.C.

(57) ABSTRACT

A fixing device includes a rotator, a heater, a rotator support, a nip formation pad, lubricant, and a pressure rotator. The heater heats an inner circumferential surface of the rotator. The rotator support supports an end of the inner circumferential surface of the rotator in an axial direction of the rotator. The rotator slides on the rotator support. The nip formation pad is in contact with the inner circumferential surface of the rotator. One end of the nip formation pad in a longitudinal direction of the nip formation pad is separated from the rotator support with a clearance of 2 mm or more. The lubricant is between the rotator and the nip formation pad. The pressure rotator presses the nip formation pad via the rotator to form a nip between the rotator and the pressure rotator.

8 Claims, 14 Drawing Sheets

(56) References Cited

U.S. PATENT DOCUMENTS

| | | | | |
|---|---|---|---|---|
| 2011/0222875 | A1 | 9/2011 | Imada et al. | |
| 2011/0222888 | A1 | 9/2011 | Ikebuchi et al. | |
| 2011/0222931 | A1 | 9/2011 | Shinshi et al. | |
| 2011/0274453 | A1 | 11/2011 | Shimokawa et al. | |
| 2012/0177388 | A1 | 7/2012 | Imada et al. | |
| 2013/0045032 | A1 | 2/2013 | Shimokawa et al. | |
| 2013/0164056 | A1 | 6/2013 | Imada et al. | |
| 2013/0189008 | A1 * | 7/2013 | Ishii | G03G 15/2025 399/329 |
| 2013/0195523 | A1 | 8/2013 | Yamaji et al. | |
| 2013/0209147 | A1 | 8/2013 | Ogawa et al. | |
| 2014/0241768 | A1 * | 8/2014 | Egi | G03G 15/2017 399/329 |
| 2014/0341627 | A1 | 11/2014 | Yoshikawa et al. | |
| 2017/0115610 | A1 * | 4/2017 | Yoshiura | G03G 15/2025 |
| 2017/0176899 | A1 | 6/2017 | Okamoto et al. | |
| 2017/0185015 | A1 | 6/2017 | Yoshinaga et al. | |
| 2018/0024462 | A1 | 1/2018 | Shimada et al. | |
| 2018/0267449 | A1 | 9/2018 | Naitoh et al. | |
| 2018/0373187 | A1 * | 12/2018 | Ikebuchi | G03G 15/2025 |
| 2020/0050144 | A1 | 2/2020 | Kabata et al. | |
| 2020/0133176 | A1 | 4/2020 | Yoshiura | |
| 2022/0026834 | A1 | 1/2022 | Yoshinaga | |
| 2023/0305455 | A1 * | 9/2023 | Matsubara | G03G 15/2025 |

OTHER PUBLICATIONS

U.S. Appl. No. 18/160,080, filed Jan. 26, 2023, Daisuke Inoue, et al.

U.S. Appl. No. 18/162,872, filed Feb. 1, 2023, Hiroshi Yoshinaga, et al.

U.S. Appl. No. 18/163,591, filed Feb. 2, 2023, Takayuki Andoh, et al.

* cited by examiner

FIXING DEVICE AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2022-043345, filed on Mar. 18, 2022, and No. 2022-152687, filed on Sep. 26, 2022, in the Japan Patent Office, the entire disclosures of which are hereby incorporated by reference herein.

BACKGROUND

Technical Field

Embodiments of the present disclosure relate to a fixing device including a rotator such as an endless belt and a heater heating an inner circumferential surface of the rotator and an image forming apparatus including the fixing device.

Related Art

In image forming apparatuses such as a copier, a printer, a facsimile machine, and a multifunction peripheral of them, one type of image forming apparatus includes a fixing device employing a surf system or a belt system. The surf system or the belt system includes a rotatable endless belt as a rotator. A heater such as a halogen heater heats the inner circumferential surface of the endless belt. Belt supports as rotator supports, such as flanges, support both ends of the inner circumferential surface of the endless belt in an axial direction of the endless belt so that the belt slides on the belt supports.

The fixing device includes a nip formation pad inside a loop of the endless belt and a pressure rotator. The pressure rotator contacts and presses the nip formation pad via the endless belt to form a nip. A conveyed medium such as a sheet passes through the nip. Lubricant is interposed between the endless belt and the nip formation pad in order to reduce frictional resistance and prevent the occurrence of abnormal noise.

SUMMARY

This specification describes an improved fixing device that includes a rotator, a heater, a rotator support, a nip formation pad, lubricant, and a pressure rotator. The heater heats an inner circumferential surface of the rotator. The rotator support supports an end of the inner circumferential surface of the rotator in an axial direction of the rotator. The rotator slides on the rotator support. The nip formation pad is in contact with the inner circumferential surface of the rotator. One end of the nip formation pad in a longitudinal direction of the nip formation pad is separated from the rotator support with a clearance of 2 mm or more. The lubricant is between the rotator and the nip formation pad. The pressure rotator presses the nip formation pad via the rotator to form a nip between the rotator and the pressure rotator.

This specification also describes an image forming apparatus including the fixing device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
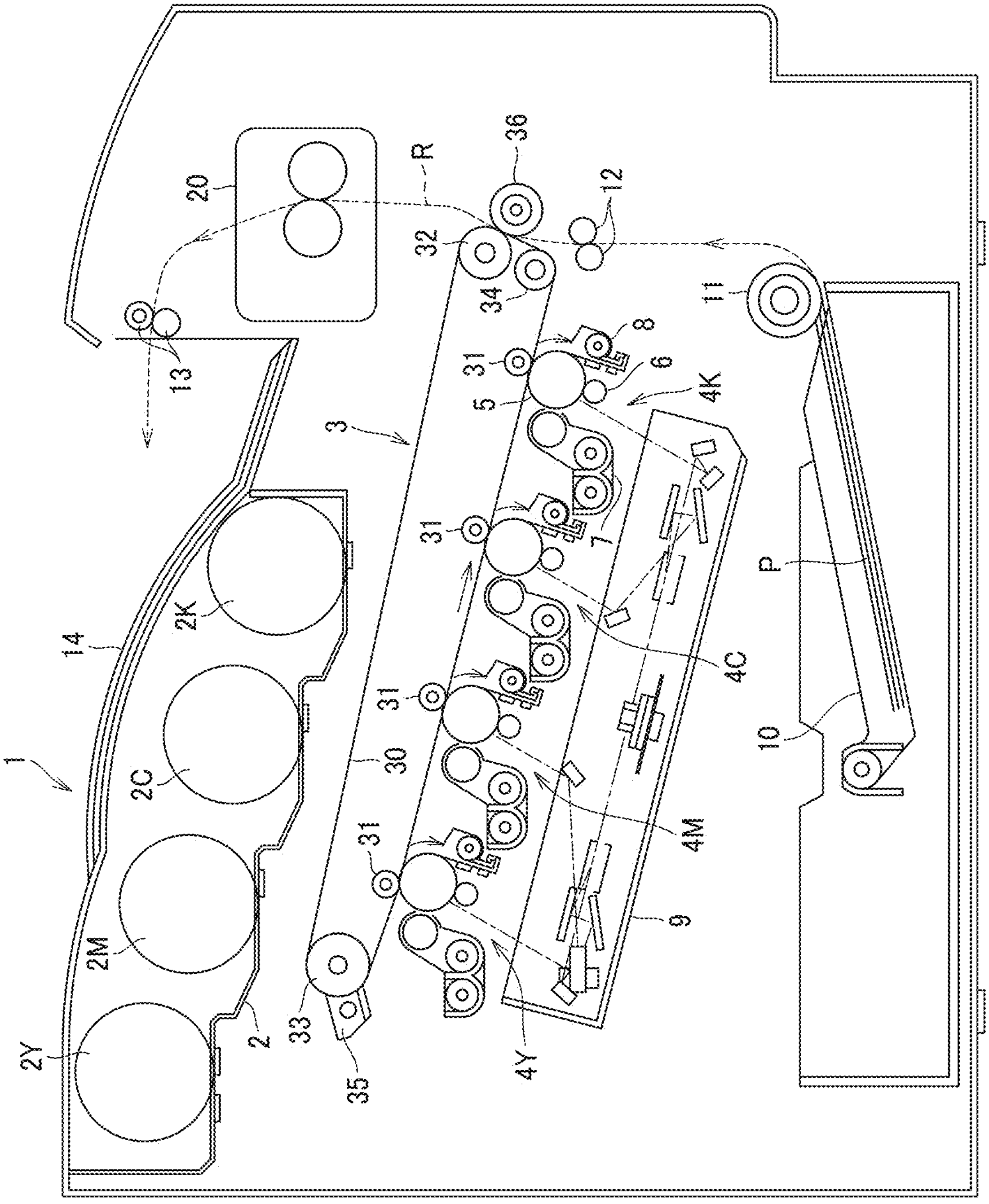
FIG. 1 is a schematic cross-sectional view of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings illustrating the following embodiments, the same reference numbers are allocated to elements having the same function or shape, and redundant descriptions thereof are omitted below.

With reference to FIG. 1, the following describes a schematic configuration and operation of an image forming apparatus 1 including a fixing device 20 according to an embodiment of the present disclosure and next describes details of the fixing device 20.

FIG. 1 is a schematic view of the image forming apparatus 1. In the present embodiment, the image forming apparatus 1 is a color laser printer. The image forming apparatus 1 includes four image forming devices 4Y, 4M, 4C, and 4K in a center portion of a body of the image forming apparatus 1. The image forming devices 4Y, 4M, 4C, and 4K have substantially the same configuration except for containing different color developers (e.g., toners) of yellow (Y), magenta (M), cyan (C), and black (K), respectively, corresponding to color separation components of color images.

Specifically, each of the image forming devices 4Y, 4M, 4C, and 4K includes, e.g., a photoconductor 5 having a drum shape and serving as a latent image bearer, a charger 6 that charges the surface of the photoconductor 5, a developing device 7 that supplies toner to the surface of the photoconductor 5, and a cleaner 8 that cleans the surface of the photoconductor 5. FIG. 1 illustrates reference numerals assigned to the photoconductor 5, the charger 6, the developing device 7, and the cleaner 8 of the image forming device 4K that forms a black toner image. However, reference numerals for the image forming devices 4Y, 4C, and 4M that form yellow, cyan, and magenta toner images, respectively, are omitted for convenience.

An exposure device 9 is disposed below the image forming devices 4Y, 4M, 4C, and 4K and exposes the outer circumferential surfaces of the respective photoconductors 5 with laser beams. The exposure device 9 includes a light source, a polygon mirror, an f-θ lens, and a reflection mirror to irradiate the surface of the photoconductor 5 with the laser beam according to image data.

A transfer device 3 is disposed above the image forming devices 4Y, 4M, 4C, and 4K. The transfer device 3 includes an intermediate transfer belt 30 serving as an intermediate transferor and four primary transfer rollers 31 serving as primary transfer devices.

The transfer device 3 also includes a secondary transfer roller 36 as a secondary transfer device and a secondary transfer backup roller 32. In addition, the transfer device 3 includes a cleaning backup roller 33, a tension roller 34, and a belt cleaner 35.

The intermediate transfer belt 30 is an endless belt stretched taut across the secondary transfer backup roller 32, the cleaning backup roller 33, and the tension roller 34. In the present embodiment, as a driver drives and rotates the secondary transfer backup roller 32 in a counterclockwise direction, the intermediate transfer belt 30 rotates in a direction indicated by an arrow in FIG. 1 by friction therebetween.

The four primary transfer rollers 31 sandwich the intermediate transfer belt 30 together with the four photoconductors 5, forming four primary transfer nips between the intermediate transfer belt 30 and the photoconductors 5, respectively. Each primary transfer roller 31 is connected to a power supply. The power supply applies a predetermined direct current (DC) voltage and/or alternating current (AC) voltage to each of the primary transfer rollers 31.

The intermediate transfer belt 30 is interposed between the secondary transfer roller 36 and the secondary transfer backup roller 32 to form a secondary transfer nip. Similar to the primary transfer rollers 31, the secondary transfer roller 36 is connected to a power supply that applies a predetermined direct current (DC) voltage and/or alternating current (AC) voltage to the secondary transfer roller 36.

The belt cleaner 35 includes a cleaning brush and a cleaning blade that contact an outer circumferential surface of the intermediate transfer belt 30. A waste toner conveyance tube extends from the belt cleaner 35 to an inlet of a waste toner container to convey waste toner collected from the intermediate transfer belt 30 by the belt cleaner 35 to the waste toner container.

A bottle holder 2 disposed in an upper portion of the image forming apparatus 1 accommodates four toner bottles 2Y, 2C, 2M, and 2K detachably attached to the bottle holder 2. The toner bottles 2Y, 2C, 2M, and 2K contain fresh yellow, cyan, magenta, and black toners to be supplied to the developing devices 7 of the image forming devices 4Y, 4C, 4M, and 4K, respectively. The fresh toner is supplied from the toner bottles 2Y, 2M, 2C, and 2K to the respective developing devices 7 through toner supply tubes connected between the toner bottles 2Y, 2M, 2C, and 2K and the respective developing devices 7.

In a lower portion of the body of the image forming apparatus 1, a sheet feeding tray and a sheet feeding roller 11 are disposed. The sheet feeding tray 10 contains sheets P as recording media. The sheet feeding roller 11 feeds the sheet P from the sheet feeding tray 10. The sheets P as the recording media may be plain paper, thick paper, postcards, envelopes, thin paper, coated paper, art paper, tracing paper, overhead projector (OHP) transparencies, and the like. Additionally, a bypass tray may be attached to the image forming apparatus 1 to place such recording media thereon.

The image forming apparatus 1 includes a conveyance path R to convey the sheet P from the sheet feeding tray 10 to a sheet ejection roller pair 13 via the secondary transfer nip. The sheet ejection roller pair 13 ejects the sheet P outside the image forming apparatus 1. In the conveyance path R, a pair of timing rollers 12 is disposed upstream from the secondary transfer nip in a direction in which the sheet P is conveyed (hereinafter simply referred to as a sheet conveyance direction). The pair of timing rollers 12 sends out the sheet P fed from the sheet feeding roller 11 toward the secondary transfer nip at a predetermined time.

The fixing device 20 is disposed downstream from the secondary transfer roller 36 in the sheet conveyance direction. The fixing device 20 receives the sheet P bearing a toner image and fixes the toner image onto the sheet P. On the conveyance path R downstream from the fixing device 20 in the sheet conveyance direction, the sheet ejection roller pair 13 is disposed. The sheet ejection roller pair 13 ejects the sheet P onto an output tray 14. To stack the sheet P ejected outside the image forming apparatus 1, the output tray 14 is disposed on a top surface of the image forming apparatus 1.

Next, a basic operation of the image forming apparatus 1 (illustrated as the laser printer) according to the present embodiment is described below with reference to FIG. 1. When an image forming operation is started, a driver drives and rotates the photoconductor 5 in each of the image forming devices 4Y, 4M, 4C, and 4K clockwise in FIG. 1, and the charger 6 uniformly charges the surface of the photoconductor 5 in a predetermined polarity.

The exposure device 9 emits laser beams onto the charged outer circumferential surfaces of the photoconductors 5, respectively, thus forming electrostatic latent images on the photoconductors 5. The image data used to expose the respective photoconductors 5 is monochrome image data produced by decomposing a desired full color image into yellow, cyan, magenta, and black image data. The developing devices 7 supply yellow, cyan, magenta, and black toners to the electrostatic latent images formed on the photoconductors 5, visualizing the electrostatic latent images as yellow, cyan, magenta, and black toner images, respectively.

Simultaneously, as the image forming operation is started, the secondary transfer backup roller 32 is driven and rotated counterclockwise in FIG. 1, rotating the intermediate transfer belt 30 in the direction indicated by the arrow in FIG. 1 by friction therebetween. The power supply applies a constant voltage or a constant current control voltage having a polarity opposite the polarity of the toner to the primary transfer roller 31, creating a transfer electric field at each primary transfer nip formed between the photoconductor 5 and the primary transfer roller 31.

When the yellow, magenta, cyan, and black toner images formed on the photoconductors 5 reach the primary transfer nips, respectively, in accordance with rotation of the photoconductors 5, the transfer electric fields generated at the primary transfer nips transfer the yellow, magenta, cyan, and black toner images from the photoconductors 5 onto the intermediate transfer belt 30, respectively, such that the yellow, magenta, cyan, and black toner images are superimposed successively on the intermediate transfer belt 30. Thus, a full color toner image is formed on the outer circumferential surface of the intermediate transfer belt 30.

After the primary transfer of the yellow, cyan, magenta, and black toner images from the photoconductors 5 onto the intermediate transfer belt 30, residual toner that is not transferred onto the intermediate transfer belt 30 remains on each of the photoconductors 5. Each of the cleaners 8 removes the residual toner from each of the photoconductors 5. Thereafter, a discharger removes the charge on the outer circumferential surface of the photoconductor 5 to ready the photoconductor 5 for the next image formation.

On the other hand, the sheet feeding roller 11 disposed in the lower portion of the image forming apparatus 1 is driven and rotated to feed the sheet P from the sheet feeding tray toward the pair of timing rollers 12 through the conveyance path R. When the sheet P comes into contact with the pair of timing rollers 12, the pair of timing rollers 12 temporarily stops conveying the sheet P.

Thereafter, the pair of timing rollers 12 is rotated at a predetermined time to convey the sheet P to the secondary transfer nip in synchronization with the full-color toner image formed on the intermediate transfer belt 30 reaching the secondary transfer nip. The power supply applies a transfer voltage to the secondary transfer roller 36. The transfer voltage has the polarity opposite the polarity of the charged toner contained in the full-color toner image formed on the intermediate transfer belt 30. As a result, a transfer electric field is generated at the secondary transfer nip.

The transfer electrical field transfers the full-color toner image from the intermediate transfer belt 30 onto the sheet P at a time. After the secondary transfer of the full color toner image from the intermediate transfer belt 30 onto the sheet P, residual toner that is not transferred to the sheet P remains on the intermediate transfer belt 30. The belt cleaner 35 removes the residual toner from the intermediate transfer belt 30. The removed toner is conveyed and collected into the waste toner container disposed inside the image forming apparatus 1.

Thereafter, the sheet P bearing the full color toner image is conveyed to the fixing device 20 that fixes the full color toner image on the sheet P. The sheet P bearing the fixed full-color toner image is ejected by the sheet ejection roller pair 13 onto the outside of the image forming apparatus 1 and is stacked on the output tray 14.

The above describes the image forming operation of the image forming apparatus 1 to form the full-color toner image on the sheet P. Alternatively, the image forming apparatus 1 may form a monochrome toner image by using any one of the four image forming devices 4Y, 4C, 4M, and 4K or may form a bicolor toner image or a tricolor toner image by using two or three of the image forming devices 4Y, 4C, 4M, and 4K.

Figure 2A:
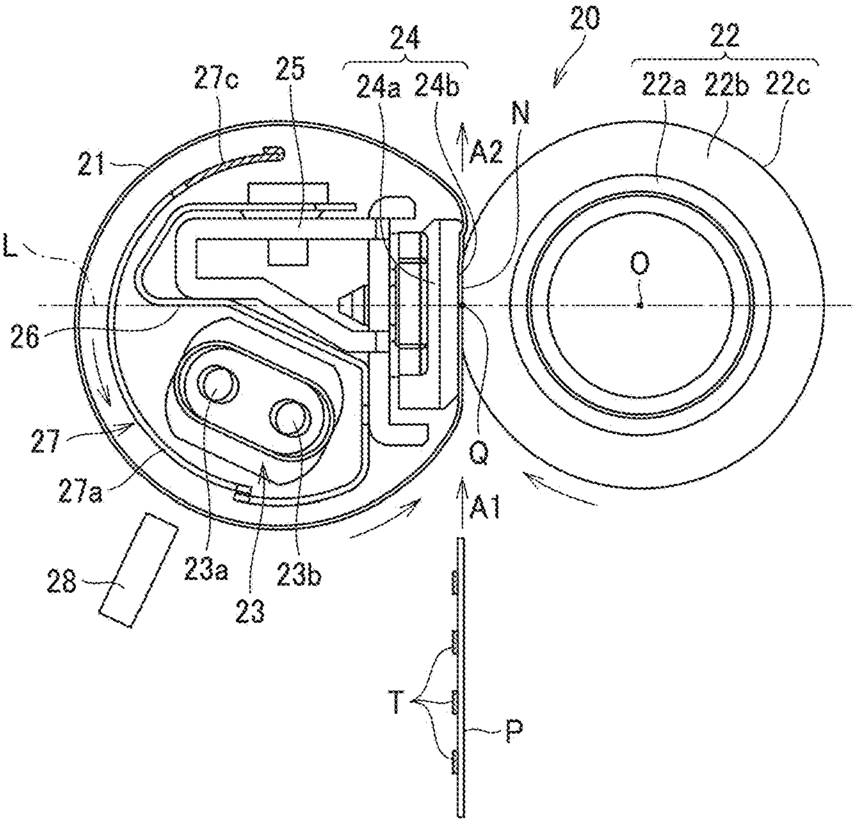
FIG. 2A is a schematic cross-sectional view of a fixing device including a shield that is moved to a light-shielding position.
Figure 2B:
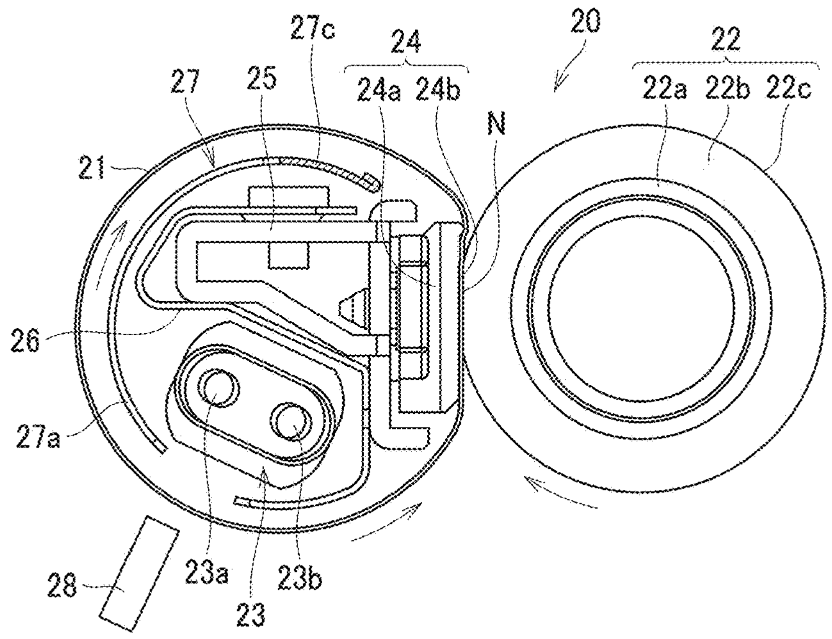
FIG. 2B is a schematic cross-sectional view of the fixing device including the shield that is moved to a retracted position.

With reference to FIGS. 2A and 2B, the following describes the fixing device 20. FIGS. 2A and 2B are schematic cross-sectional views of the fixing device 20. The fixing device 20 is one example of a nip forming unit. The fixing device 20 includes a fixing belt 21 and a pressure roller 22 as an opposed rotator in contact with the outer circumferential surface of the fixing belt 21.

The fixing device 20 also includes a halogen heater 23, a nip formation pad 24, a stay 25, a reflector 26, a shield 27, and a temperature sensor 28. The halogen heater serves as a heat source to heat the fixing belt 21. The nip formation pad 24 is in contact with the inner circumferential surface of the fixing belt 21. The pressure roller 22 presses the fixing belt 21 against the nip formation pad 24 to form a fixing nip N. The stay 25 supports the nip formation pad 24. The halogen heater 23 radiates radiant heat, and the reflector 26 reflects the radiant heat to the fixing belt 21. The shield 27 shields the radiant heat radiated from the halogen heater 23. The temperature sensor 28 serves as a temperature detector to detect the temperature of the fixing belt 21.

The fixing belt 21 is a thin, flexible, endless belt (which may be a film). Specifically, the fixing belt 21 includes a base layer forming the inner circumferential surface of the fixing belt 21. The base layer is made of metal such as nickel or steel use stainless (SUS) or resin such as polyimide (PI).

The fixing belt 21 includes a release layer made of tetrafluoroethylene-perfluoroalkylvinylether copolymer (PFA), polytetrafluoroethylene (PTFE) or the like. The release layer is an outermost layer. Optionally, an elastic layer made of rubber such as silicone rubber, silicone rubber foam, and fluoro rubber may be interposed between the base layer and the release layer.

The fixing belt 21 not including the elastic layer has a small thermal capacity that improves a fixing property. However, as the pressure roller 22 and the fixing belt 21 sandwich and press the unfixed toner image T on the sheet P passing through the fixing nip N, slight surface asperities of the fixing belt 21 may be transferred onto the toner image T on the sheet P, resulting uneven gloss of the solid toner image T. To address this circumstance, preferably, the fixing belt 21 includes the elastic layer no thinner than 80 μm. The elastic layer not thinner than 80 μm elastically deforms to absorb the slight surface asperities in the fixing belt 21, thus preventing uneven gloss of the toner image on the sheet P.

In order to decrease the thermal capacity of the fixing belt 21, the fixing belt 21 in the present embodiment is thin and has a decreased loop diameter. For example, the base layer of the fixing belt 21 is designed to have a thickness of from 20 μm to 50 μm, the elastic layer is designed to have a thickness of from 80 μm to 300 μm, and the release layer is designed to have a thickness of from 3 μm to 50 μm. Thus, the fixing belt 21 is designed to have a total thickness not greater than 1 mm.

The loop diameter of the fixing belt 21 is set in a range of 20 mm to 40 mm. In order to further decrease the thermal capacity of the fixing belt 21, preferably, the fixing belt 21 may have a total thickness not greater than 0.20 mm and more preferably not greater than 0.16 mm. Preferably, the loop diameter of the fixing belt 21 may be 30 mm or less.

The pressure roller 22 includes a cored bar 22*a*, an elastic layer 22*b* disposed on the surface of the cored bar 22*a*, and a release layer 22*c* disposed on the surface of the elastic layer 22*b*. The elastic layer 22*b* is made of foamed silicone rubber, silicon rubber, or fluoro-rubber. The release layer 22*c* is made of PFA or PTFE. A biasing member such as a spring presses the pressure roller 22 against the nip formation pad 24 via the fixing belt 21. Thus, the pressure roller 22 abuts on the nip formation pad 24 via the fixing belt 21. At a portion at which the pressure roller 22 contacts and presses the fixing belt 21, deformation of the elastic layer 22*b* of the pressure roller 22 forms the fixing nip N having a predetermined width in the sheet conveyance direction.

A driver such as a motor disposed inside the image forming apparatus 1 drives and rotates the pressure roller 22. As the driver drives and rotates the pressure roller 22, a driving force of the driver is transmitted from the pressure roller 22 to the fixing belt 21 at the fixing nip N, thus rotating the fixing belt 21 in accordance with rotation of the pressure roller 22 by friction between the fixing belt 21 and the pressure roller 22. As described later with reference to FIG. 3, flanges 40 as belt supports are inserted into both ends of the fixing belt 21 to rotatably hold the fixing belt 21. However, in the fixing nip N, the flanges 40 do not support both ends of the fixing belt 21.

In the present embodiment, the pressure roller 22 is a solid roller. Alternatively, the pressure roller 22 may be a hollow roller. In a case in which the pressure roller 22 is the hollow roller, a heat source such as the halogen heater may be disposed inside the pressure roller 22.

The elastic layer 22*b* of the pressure roller 22 may be made of solid rubber. Alternatively, if no heater is disposed inside the pressure roller 22, the elastic layer of the pressure roller 22 may be made of sponge rubber. The sponge rubber is preferable to the solid rubber because the sponge rubber has enhanced thermal insulation that draws less heat from the fixing belt 21.

The halogen heater 23 is disposed inside the loop of the fixing belt 21 and upstream from the fixing nip N in the sheet conveyance direction. Specifically, as illustrated in FIG. 2A, the halogen heater 23 is disposed, in the sheet conveyance direction, upstream from an imaginary line L passing through the center Q of the fixing nip N in the sheet conveyance direction and the rotation center O of the pressure roller 22, that is, in a lower portion from the line L in FIG. 2A.

A power supply situated inside the image forming apparatus 1 supplies power to the halogen heater 23 so that the halogen heater 23 generates heat. A controller operatively connected to the halogen heater 23 and the temperature sensor 28 controls the halogen heater 23 based on the temperature of the outer circumferential surface of the fixing belt 21, which is detected by the temperature sensor 28.

Such heating control of the halogen heater 23 adjusts the temperature of the fixing belt 21 to a desired fixing temperature. Instead of the temperature sensor 28 that detects the temperature of the fixing belt 21, a temperature sensor that detects the temperature of the pressure roller 22 may be disposed, and the controller may predict the temperature of the fixing belt 21 based on the temperature of the pressure roller 22 detected by the temperature sensor.

In the present embodiment, two halogen heaters 23 are disposed in the loop of the fixing belt 21, but one halogen heater 23 or three or more halogen heaters 23 may be disposed in the loop of the fixing belt 21 based on the size of the sheet P used in the image forming apparatus 1. However, when the cost of the halogen heater 23 itself, a space inside the loop of the fixing belt 21, and the like are considered, a desirable number of the halogen heaters 23 is two or less. The radiant heat radiated from the heater heats the fixing belt 21. The heater may be a resistive heat generator or carbon heater instead of the halogen heater.

The nip formation pad 24 includes a base pad 24*a* and a sliding sheet 24*b* disposed on the surface of the base pad 24*a*, the surface facing the fixing belt 21. The sliding sheet 24*b* is a low friction member. The base pad 24*a* extends in the axial direction of the fixing belt 21 or the axial direction of the pressure roller 22.

The sliding sheet 24*b* is not always necessary. The surface of the base pad 24*a* itself having a good sliding performance with the fixing belt 21 enables omitting the sliding sheet 24*b*.

The base pad 24*a* receives a pressing force from the pressure roller 22 and determines a shape of the fixing nip N. In the present embodiment, the shape of the fixing nip N is a flat shape but may be a concave shape or another shape.

The sliding sheet 24*b* is disposed to reduce sliding friction when the fixing belt 21 rotates. The base pad 24*a* itself made of a low-friction member enables a configuration not including the sliding sheet 24*b*.

The base pad 24*a* is made of a heat-resistant material having a heat-resistant temperature of 200° C. or more to prevent deformation of the nip formation pad 24 due to heat in the toner fixing temperature range, thereby ensuring a stable state of the fixing nip N and stabilizing qualities in the image on the ejected sheet P. The material of the base pad 24*a* may be general heat-resistant resins such as polyethersulfone (PES), polyphenylene sulfide (PPS), liquid crystal polymer (LCP), polyethernitrile (PEN), polyamide-imide (PAI), and polyetheretherketone (PEEK).

The stay 25 supports and fixes the base pad 24*a*. The stay 25 prevents the nip formation pad 24 from being bent by the pressure from the pressure roller 22 to form the fixing nip having a uniform width along the axial direction of the pressure roller 22.

Preferably, the stay 25 is made of metal having an increased mechanical strength, such as stainless steel and iron, to prevent bending of the nip formation pad 24. The base pad 24*a* is preferably made of a rigid material to ensure the strength of the base pad 24*a*. The material of the base pad 24*a* may be resins such as liquid crystal polymers (LCP), metals, ceramics, or the like.

The reflector 26 is fixed and supported by the stay 25 so as to face the halogen heater 23. The reflector 26 reflects the radiant heat and light emitted from the halogen heater 23 toward the fixing belt 21 to prevent the heat from being transmitted to the stay 25 and the like, thereby efficiently heating the fixing belt 21 and saving energy.

The material of the reflector 26 may be aluminum, stainless steel, or the like. In particular, the reflector made of an aluminum base on which silver having low emissivity (in other words, high reflectivity) is evaporated improves the heating efficiency of the fixing belt 21.

A surface of the reflector 26 facing the halogen heater 23 is formed to spread over the inner circumferential surface of the fixing belt 21. As illustrated in FIG. 2A. the reflector 26 has a portion facing a lower portion of the halogen heater 23 and extending along a circumferential direction of the fixing belt 21 to shield radiant heat radiated from both ends of the halogen heater 23. The above-described portion of the reflector 26 does not extend over the entire length of the reflector 26 in the longitudinal direction of the reflector 26.

The shield 27 is made of a metal plate such as a SUS plate having heat resistance and a thickness of 0.1 mm to 1.0 mm so as to have a cross-sectional shape along the inner circumferential surface of the fixing belt 21. In FIGS. 2A and 2B, the cross-sectional shape of the shield 27 has ends and is not a ring closed in the circumferential direction. Specifically, the cross-sectional shape of the shield 27 is an arc.

The shield 27 is rotatable around the halogen heater 23. In the present embodiment, the shield 27 is rotatable along the circumferential direction of the fixing belt 21. Specifically, a circumferential region of the fixing belt 21 has a directly heated region directly facing the halogen heater 23 and heated by the halogen heater 23. In addition, the circumferential region of the fixing belt 21 has a non-directly heated region in which a member other than the shield 27, such as the reflector 26, the stay 25, or the nip formation pad 24 exists between the halogen heater 23 and the fixing belt 21.

When the shield 27 thermally shields between the halogen heater 23 and the fixing belt 21, the shield 27 is disposed at a shielding position facing the directly heated region as illustrated in FIG. 2A. When the shield 27 does not thermally shield between the halogen heater 23 and the fixing belt 21, the shield 27 is moved to a retracted position facing the non-directly heated region as illustrated in FIG. 2B.

In other words, the shield 27 is retracted to a space above upper portions of the reflector 26 and the stay 25. The shield 27 is preferably made of ceramic or metal such as aluminum, iron, or SUS because the shield 27 requires heat resistance.

Figure 3:
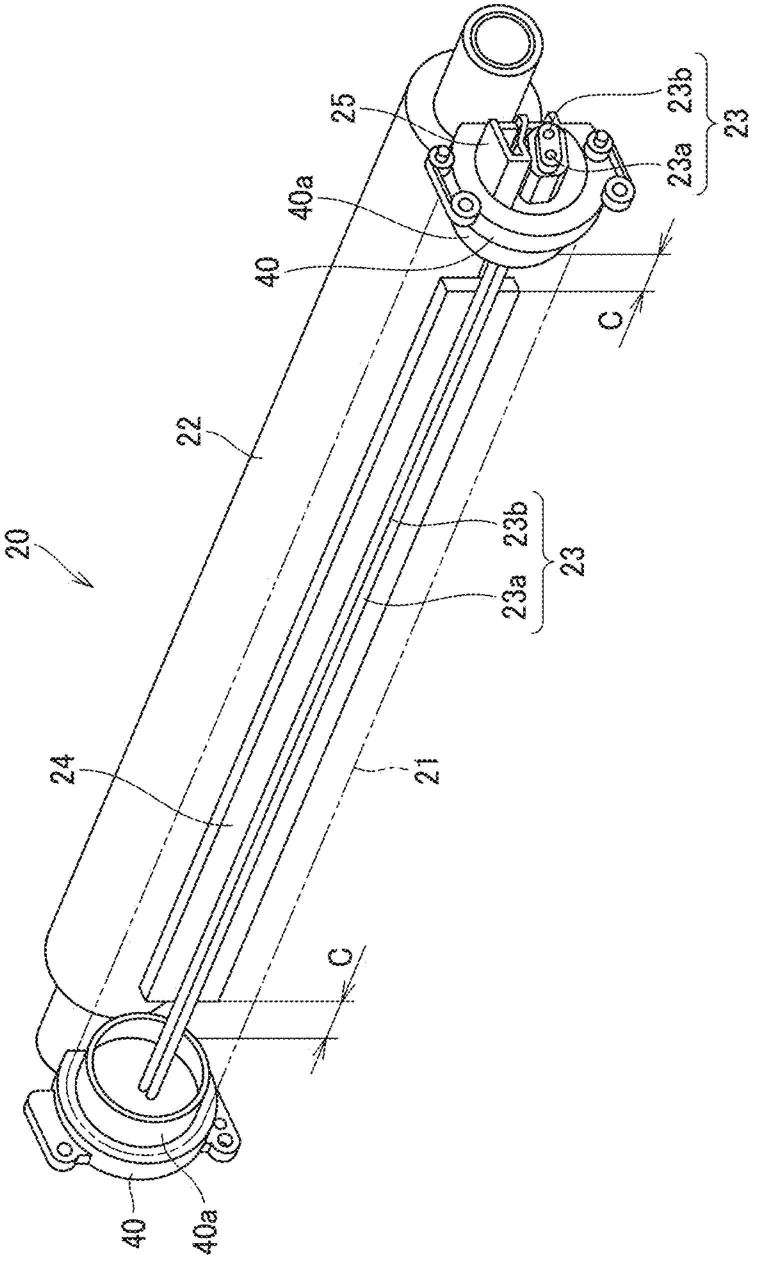
FIG. 3 is a perspective view of a part of the fixing device of FIGS. 2A and 2B.

FIG. 3 is a perspective view of a part of the fixing device 20 according to the present embodiment. FIG. 3 omits the sliding sheet 24*b*, the stay 25, the shield 27, and the like. As illustrated in FIG. 3, cylindrical portions 40*a* of the flanges 40 are inserted into loops of both ends of the fixing belt 21, respectively.

The cylindrical portions 40*a* of the flanges 40 come into contact with both ends of the inner circumferential surface of the fixing belt 21 in the axial direction of the fixing belt 21, respectively, and both ends of the inner circumferential surface of the fixing belt 21 slide on the cylindrical portions 40*a* of the flanges 40. As a result, the cylindrical portions 40*a* of the flanges 40 rotatably hold the fixing belt 21. The fixing device 20 includes a pair of side plates that supports and fixes left and right flanges 40, the halogen heater 23, the nip formation pad 24 in FIG. 3, and the stay 25 in FIGS. 2A and 2B.

With continued reference to FIGS. 2A and 2B, the following describes a fixing operation of the fixing device 20 according to the present embodiment. As the image forming apparatus 1 illustrated in FIG. 1 is powered on, power is supplied to the halogen heater 23, and the driver starts driving and rotating the pressure roller 22 clockwise in FIGS. 2A and 2B. The rotation of the pressure roller 22 drives the fixing belt 21 to rotate counterclockwise in FIGS. 2A and 2B by friction between the fixing belt 21 and the pressure roller 22.

Thereafter, the sheet P bearing the unfixed toner image T formed in the image forming processes described above is conveyed in the sheet conveyance direction A1 in FIG. 2A while guided by a guide plate and enters the fixing nip N formed between the fixing belt 21 and the pressure roller 22 pressed against the fixing belt 21. The toner image T is fixed onto the sheet P under heat from the fixing belt 21 heated by the halogen heater 23 and pressure exerted between the fixing belt 21 and the pressure roller 22.

The sheet P bearing the fixed toner image T is sent out from the fixing nip N and conveyed in a direction indicated by an arrow A2 in FIG. 2A. As a leading edge of the sheet P contacts a front edge of the separator, the separator separates the sheet P from the fixing belt 21. The sheet P separated from the fixing belt 21 is ejected by the sheet ejection roller pair 13 depicted in FIG. 1 to the outside of the image forming apparatus 1 and stacked on the output tray 14.

The following describes a configuration of the fixing device 20.

The fixing device 20 includes the fixing belt 21, the halogen heater 23, the pressure roller 22, the nip formation pad 24, and the flanges 40.

The nip formation pad 24 and the flanges 40 may be made of a heat-resistant resin such as liquid crystal polymer. As illustrated in FIG. 3, a clearance C is formed between the cylindrical portion 40*a* of the flange 40 and each of both ends of the nip formation pad 24 in the longitudinal direction of the nip formation pad 24.

Figure 4A:
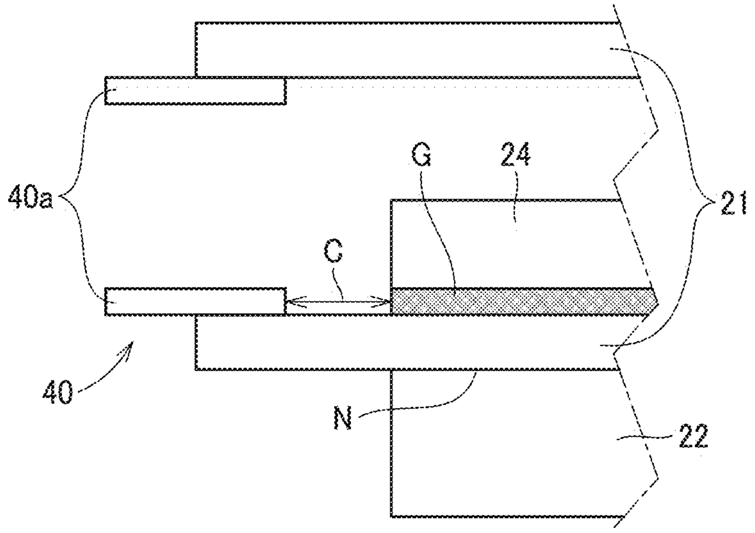
FIG. 4A is a schematic view of a main part of the fixing device according to the embodiment.

FIG. 4A is a schematic view of a main part of the fixing device illustrating the clearance C in an easy-to-understand manner. As illustrated in FIG. 4A, the feature of the fixing device according to the present embodiment is the clearance C having a predetermined size between the nip formation pad 24 and the cylindrical portion 40*a* of the flange 40. The size of the clearance C is at least equal to or larger than 2 mm in the longitudinal direction of the nip formation pad 24. The reason why the size of the clearance C is equal to or larger than 2 mm is described later.

Increasing the clearance C decreases the length of the nip formation pad 24 in the longitudinal direction thereof. The upper limit of the clearance C is determined by the nip formation pad 24 having the same length as the pressure roller 22 in the longitudinal direction as illustrated in FIG. 4A.

Lubricant G is interposed between the nip formation pad 24 and the fixing belt 21. The pressure applied to the nip N causes the lubricant G to flow outward in the longitudinal direction of the nip formation pad 24.

Figure 4B:
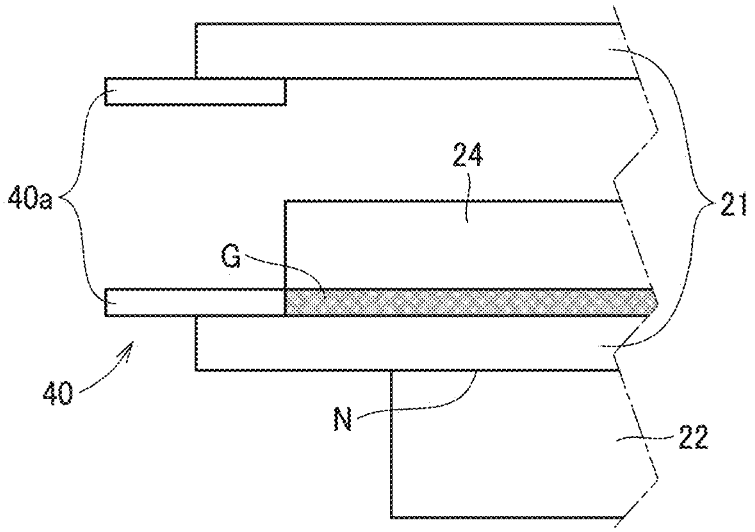
FIG. 4B is a schematic view of a main part of the fixing device according to a comparative embodiment.

A fixing device according to a comparative embodiment illustrated in FIG. 4B includes the nip formation pad 24 having both ends in contact with the cylindrical portions 40*a* of the flanges 40 in the longitudinal direction of the nip formation pad 24. In the fixing device having no clearance between the nip formation pad 24 and the flange 40 as described above, the lubricant G between the nip formation pad 24 and the fixing belt 21 easily flows to the inner peripheral surface and the outer peripheral surface of the cylindrical portion 40*a* of the flange 40.

In contrast, the fixing device according to the present embodiment has the clearance C between the nip formation pad 24 and the cylindrical portion 40*a* of the flange 40 as illustrated in FIG. 4A. Therefore, the lubricant G is unlikely to flow to the inner peripheral surface and the outer peripheral surface of the cylindrical portion 40*a* of the flange 40. Even if a part of the lubricant G overflows into the clearance C, the clearance C functions as a lubricant reservoir and holds the lubricant G in the clearance C.

The following describes how ultrafine particles are generated in the fixing device.

To examine how the ultrafine particles are generated in the fixing device, the image forming apparatus including the fixing device according to the comparative embodiment as illustrated in FIG. 4B performed a continuous printing test for ten minutes. As the lubricant G, fluorine grease 70 mg and silicone oil 35 mg were used.

Figure 5A:
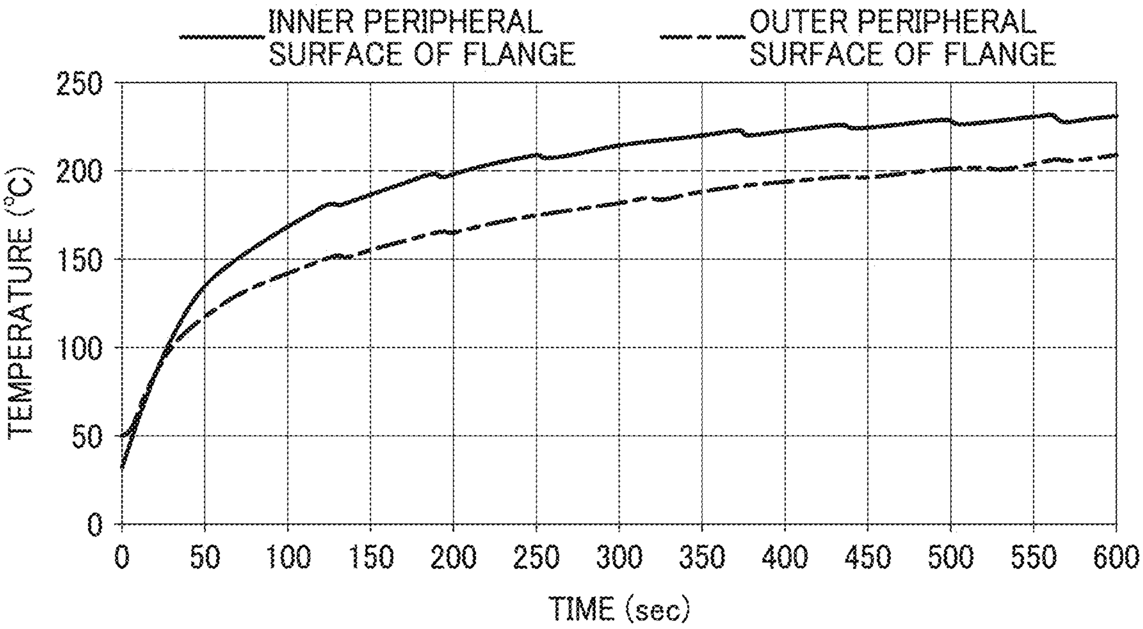
FIG. 5A is a graph illustrating a relation between an operating time of the fixing device and the temperature of an inner circumferential surface of a flange and a relation between the operating time and temperature of an outer circumferential surface of the flange.
Figure 5B:
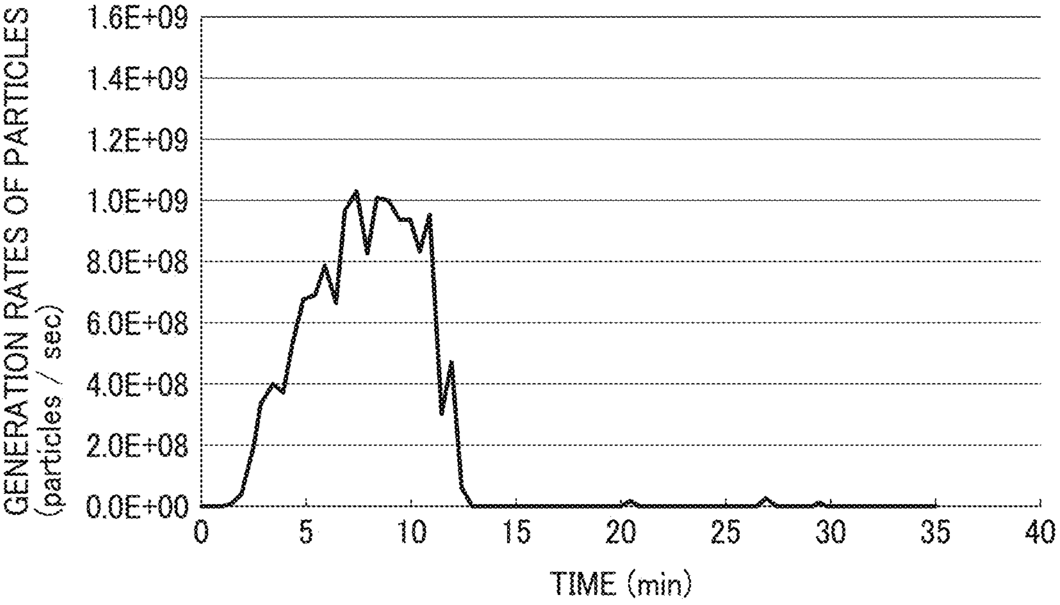
FIG. 5B is a graph illustrating a relation between the operating time of the fixing device and a generation rate of fine particles.

During the printing test, temperatures were measured in the inner peripheral surface and the outer peripheral surface of the flange 40 of the fixing device. FIG. 5A illustrates measurement results. In addition, generation rates (particles/second) of particles including fine particles (FP) and the ultrafine particles (UFP) were measured according to the measurement method specified in Blue Angel Standard. FIG. 5B illustrates measurement results of the generation rates. The concentration of generated fine particles including the ultrafine particles was measured with a fast mobility particle sizer (FMPS3091 manufactured by Tokyo Dylec Corp.).

As illustrated in FIG. 5B, the fine particles including the ultrafine particles started to come out all at once after about 3 minutes from the start of printing, gradually increased, and continued to be generated until the end of printing. The number of generated fine particles greatly exceeded the Blue Angel standard value of $3.5\times10^{11}$ particles.

In FIG. 5B, the timing at which the fine particles including the ultrafine particles rapidly increase is about 3 minutes from the start of printing. This timing (that is, about 3 minutes from the start of printing) substantially coincides with the time at which the inner peripheral surface of the flange illustrated in FIG. 5A reaches 200° C. or more.

Figure 5C:
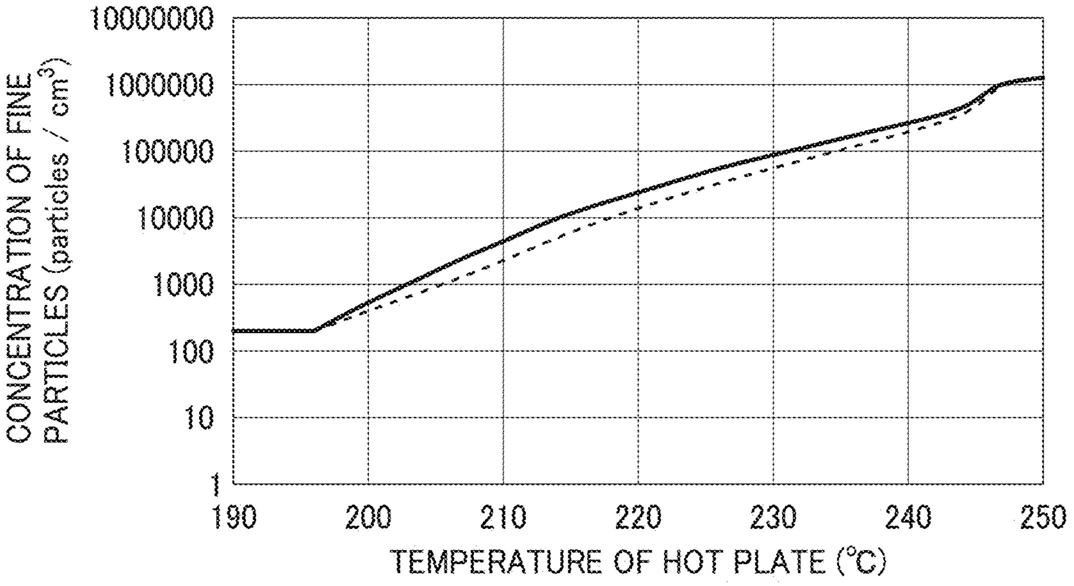
FIG. 5C is a graph illustrating a relation between temperature of a hot plate and a concentration of fine particles.

On the other hand, the lubricant G was heated by a hot plate, and concentrations of generated fine particles including ultrafine particles were measured in temperatures from 190° C. to 250° C. FIG. 5C is a graph illustrating the results of the measurements. From the results of the measurements, it can be seen that the fine particles including the ultrafine particles start to come out all at once at 200° C. or more.

Based on the above-described results, the present inventors found that the inner peripheral surface of the flange is the place in which the fine particles including the ultrafine particles are generated. The outer peripheral surface of the flange also reaches 200° C. in about 9 minutes, but before that, fine particles have already been generated. As a result, applying the present embodiment to the fixing device including the flange 40 whose temperature reaches 200° C. or more can reduce an amount of fine particles including the ultrafine particles generated in the fixing device.

The following describes the reason why the size of the clearance C is equal to or larger than 2 mm.

The present inventors made three fixing devices each having the configuration as illustrated by the schematic view of FIG. 4A. The three fixing devices had three clearances C, 2 mm, 1.5 mm, and 1.0 mm, respectively. The present inventors set each of the fixing devices in the image forming apparatus and performed continuous printing tests for ten minutes similar to the above-described printing test.

In a result of the continuous printing test of the fixing device having the clearance C=1.0 mm, the adhesion of the lubricant G to the flange 40 was remarkably recognized. In a result of the continuous printing test of the fixing device having the clearance C=1.5 mm, the adhesion of the lubricant G to the flange 40 was slightly recognized.

In a result of the continuous printing test of the fixing device having the clearance C=2.0 mm, the adhesion of the lubricant G to the flange 40 was not recognized. In addition, generation of the fine particles including the ultrafine particles was not observed. After the continuous printing test of the image forming apparatus including the fixing device with the clearance C=2.0 mm, the fixing device was disassembled, and the fixing belt 21 was cut open to observe the inner circumferential surface of the fixing belt corresponding to the clearance C, and the diameters φ of the droplets of the lubricant G adhering to the inner circumferential surface of the fixing belt corresponding to the clearance C were checked. As a result, φ≈1 mm.

Based on the above results, the present inventors found that the clearance C having at least equal to or larger than 2 mm can prevent the lubricant G that are droplets having the diameter φ≈1 mm from flowing to the flange 40 outside the nip formation pad 24 in the longitudinal direction of the nip formation pad 24 and adhering to the flange 40. To balance the pressure between the fixing belt 21 and the pressure roller 22 and ensure the fixing property of the toner to the sheet, a desired upper limit of the clearance C is a length from a position at which an inner end of the flange 40 is in contact with the inner circumferential surface of the fixing belt 21 to a position facing an end of the pressure roller 22 on the inner circumferential surface of the fixing belt 21.

The above-described configuration illustrated in FIG. 4A is a basic configuration of the fixing device according to the present disclosure. Various embodiments are possible as long as the fixing device has the clearance C between the nip formation pad 24 and the cylindrical portion 40*a* of the flange 40.

FIGS. 6A to 6D are schematic views of main parts of the fixing devices according to four embodiments, that is, the first to fourth embodiments. It goes without saying that these embodiments are examples and do not limit the present disclosure.

The first embodiment is described below with reference to FIG. 6A.

Figure 6A:
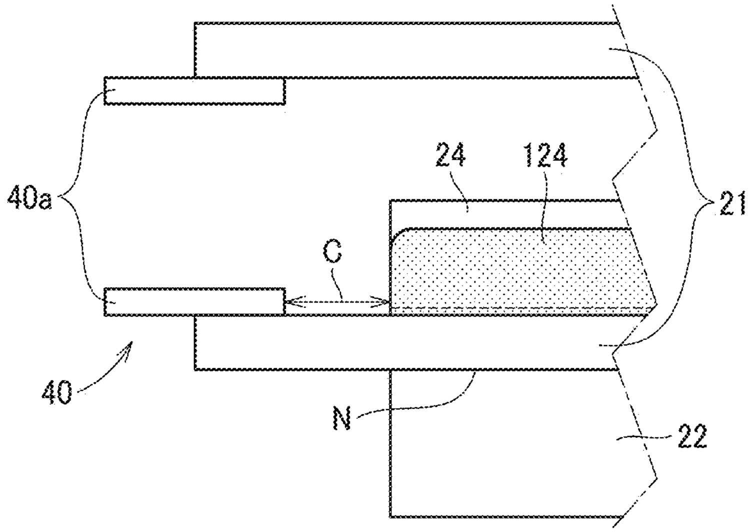
FIG. 6A is a schematic view of a main part of the fixing device according to a first embodiment.

The fixing device according to the first embodiment illustrated in FIG. 6A includes a sliding sheet 124 covering a lower surface and side surfaces of the nip formation pad 24. The sliding sheet 124 has a low friction characteristic to reduce friction with the fixing belt 21 and a high lubricant holding capacity.

The sliding sheet 124 may be an elongated rectangular sheet-like material in which resin fibers such as PTFE are woven. The sliding sheet 124 may be configured to have a shape having an opening in a vertical cross-section perpendicular to the longitudinal direction of the sliding sheet 124. Specifically, both end regions of the sliding sheet 124 in the sliding direction are bent at a substantially right angle with respect to a nip surface (that is a sliding surface), and the sliding sheet 124 has a substantially U-shape in the vertical cross-section perpendicular to the longitudinal direction. The sliding sheet 124 covers an entire nip formation surface of the nip formation pad 24, and a surface of the sliding sheet 124 corresponds to the nip surface.

The sliding sheet 124 may be a PFA sheet or a PTFE sheet each having a low frictional resistance. Alternatively, the sliding sheet 124 may be made by coating a sheet having high frictional resistance with a material having a low friction coefficient.

The lubricant G held in an impregnated state in the sliding sheet 124 is unlikely to flow outward in the longitudinal direction. Even if a part of the lubricant G protrudes into the clearance C, the lubricant G is held in the clearance C as it is.

A second embodiment is described below with reference to FIG. 6B.

Figure 6B:
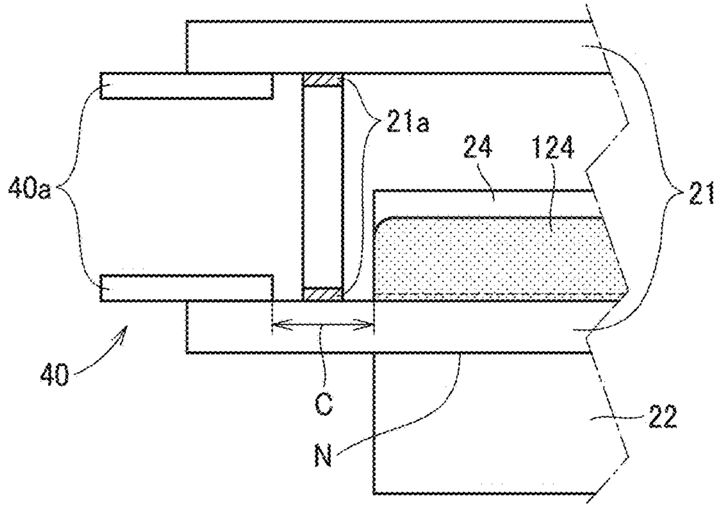
FIG. 6B is a schematic view of a main part of the fixing device according to a second embodiment.

The fixing device according to the second embodiment illustrated in FIG. 6B includes an annular projection **21*a* formed on the inner circumferential surface of the fixing belt 21 as a flow preventer that prevents the lubricant G on the inner circumferential surface of the fixing belt 21 from moving outward in addition to the configuration illustrated in FIG. 6**A.

Since rotating the fixing belt 21 generates a centrifugal force that acts on the lubricant G, the annular projection **21*a* can prevent the lubricant G from flowing out to the outside of the annular projection 21*a*** after the lubricant G flows to the clearance C.

The shape of the flow preventer is not limited to the shape of the annular projection **21*a* illustrated in FIG. 6B. The cross-sectional shape of the annular projection 21*a* is not limited to a horizontally long rectangle but may be a vertically long rectangle. The cross-sectional shape of the annular projection 21*a* may be a complicated shape having a large surface area such as an L-shape, a T-shape, or a W-shape. Increasing the surface area of the flow preventer in this way enhances the ability to retain the lubricant G, and the lubricant G is less likely to flow to the flange 40**.

A third embodiment is described below with reference to FIG. 6C.

Figure 6C:
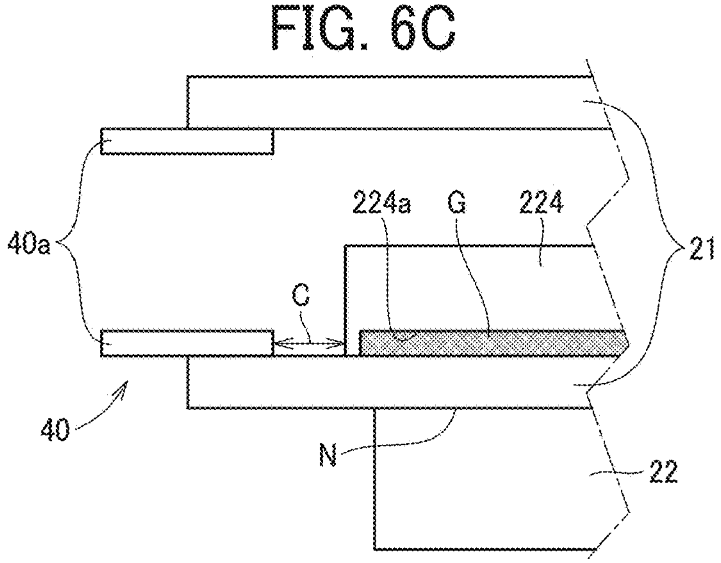
FIG. 6C is a schematic view of a main part of the fixing device according to a third embodiment.

The fixing device according to the third embodiment illustrated in FIG. 6C includes a nip formation pad 224 having a storage space **224*a* in the bottom of the nip formation pad 224. The storage space 224*a* can store the lubricant G. The storage space 224*a* may be a groove having one line shape or a plurality of grooves having a plurality of line shapes, extending in the longitudinal direction of the nip formation pad 224. Holding the lubricant G in the storage space 224*a* enables preventing the lubricant G from moving to the outside of the nip formation pad 224** in the axial direction.

A fourth embodiment is described below with reference to FIG. 6D.

Figure 6D:
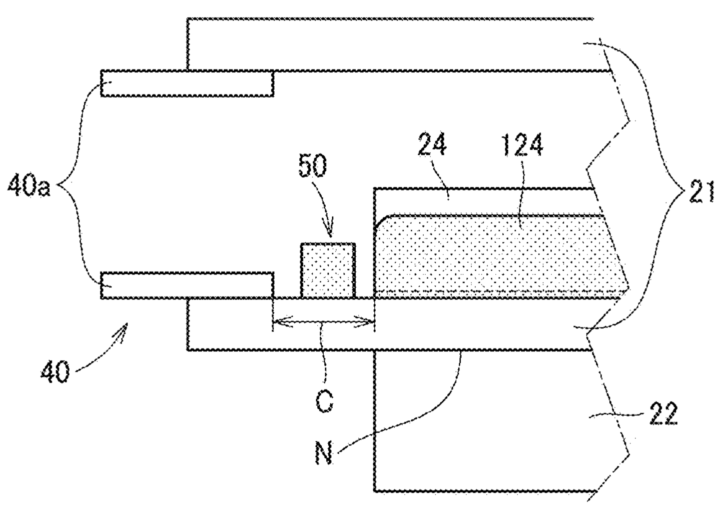
FIG. 6D is a schematic view of a main part of the fixing device according to a fourth embodiment.

The fixing device according to the fourth embodiment illustrated in FIG. 6D includes a lubricant absorber 50 disposed in the clearance C in addition to the configuration illustrated in FIG. 6A. The annular projection **21*a* is formed, for example, by attaching a ring made of urethane rubber having a width of 1 mm and a height of 2 mm to the inner circumferential surface of the fixing belt 21. The ring may be made by using a mold or by cutting a urethane rubber plate. Preferably, the annular projection 21*a* is disposed at the center of clearance C as illustrated in FIG. 6B. The lubricant absorber 50 may have the same width as the width of the nip formation pad 24 that is a length of the nip formation pad 24 in a direction perpendicular to the paper surface of FIG. 6D. The lubricant absorber 50 may be positioned by being connected to an arm portion extending from the nip formation pad 24. The lubricant absorber 50** is made of, for example, sponge or cloth.

Figure 6E:
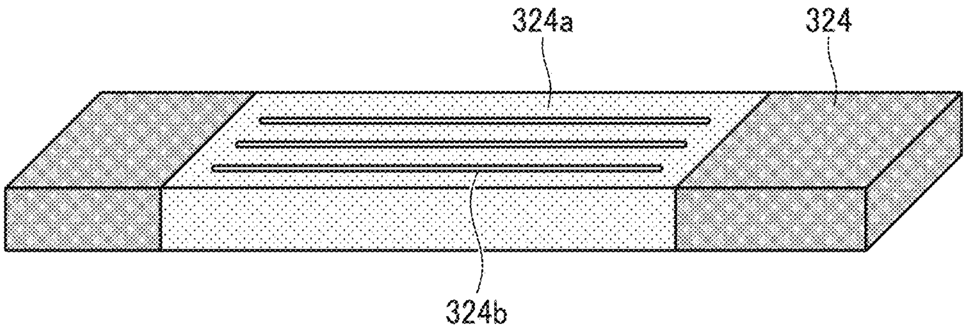
FIG. 6E is a perspective view of a nip formation pad of the fixing device according to a fifth embodiment.
Figure 6F:
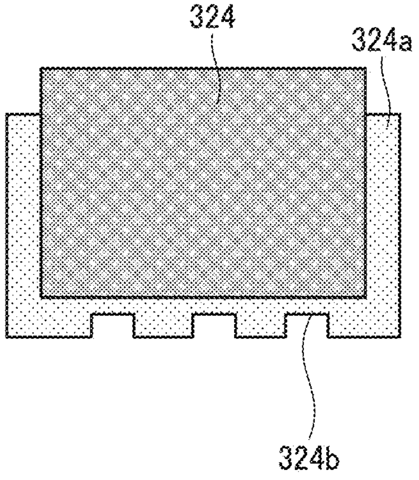
FIG. 6F is a schematic cross-sectional view of the nip formation pad of the fixing device according to the fifth embodiment.

A fifth embodiment is described below with reference to FIGS. 6E and 6F. The fixing device according to the fifth embodiment illustrated in FIGS. 6E and 6F includes a sliding sheet **324*a* covering a lower surface and side surfaces of the nip formation pad 324. The sliding sheet 324*a* has a storage space 324*b*. The storage space 324*b* is under the bottom of the nip formation pad 224. The storage space 224*a* can store the lubricant G. FIG. 6E is a perspective view of the nip formation pad 324. In FIG. 6E, the storage space 324*b* can be seen. FIG. 6F is a cross-sectional view of of the nip formation pad 324 that is cut so as to see the storage space 324*b*. After the nip formation pad 324 is assembled to the fixing device, the configuration including the storage space 324*b* is as illustrated in FIGS. 6A and 6C. The storage space 324*b* may be a groove having one line shape or a plurality of grooves having a plurality of line shapes, extending in the longitudinal direction of the nip formation pad 324. Holding the lubricant G in the storage space 324*b* enables preventing the lubricant G from moving to the outside of the nip formation pad 324 in the axial direction. The sliding sheet 324*a* may be the PFA sheet or the PTFE sheet each having the low frictional resistance. Alternatively, the sliding sheet 324*a* may be made from a sheet having a high frictional resistance and including the storage space 324*b* for the lubricant. Coating the sheet with material having a low friction coefficient produces the sliding sheet 324*a***.

Even if a part of the lubricant G moves to the clearance C, the lubricant absorber 50 absorbs and holds the lubricant G. As a result, the lubricant absorber 50 can prevent the lubricant G from flowing to the flange 40. In addition, clearances adjacent to both ends of the lubricant absorber 50 hold the lubricant G. Therefore, the lubricant G is more unlikely to flow to the flange 40.

Next, other types of fixing devices are described.

According to the embodiments of the present disclosure, the configuration of the fixing device is not limited to the configuration described above. The embodiments of the present disclosure may be applied to fixing devices having various configurations. A description is now given of some examples of the configuration of the fixing device to which the embodiments of the present disclosure are applicable.

Figure 7:
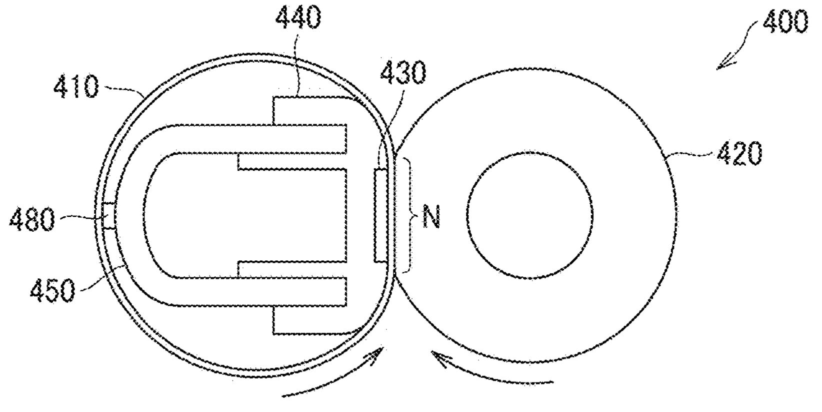
FIG. 7 is a schematic cross-sectional view of a fixing device that is different from the fixing device of FIG. 2 but applicable to the above-described embodiments.
Figure 8:
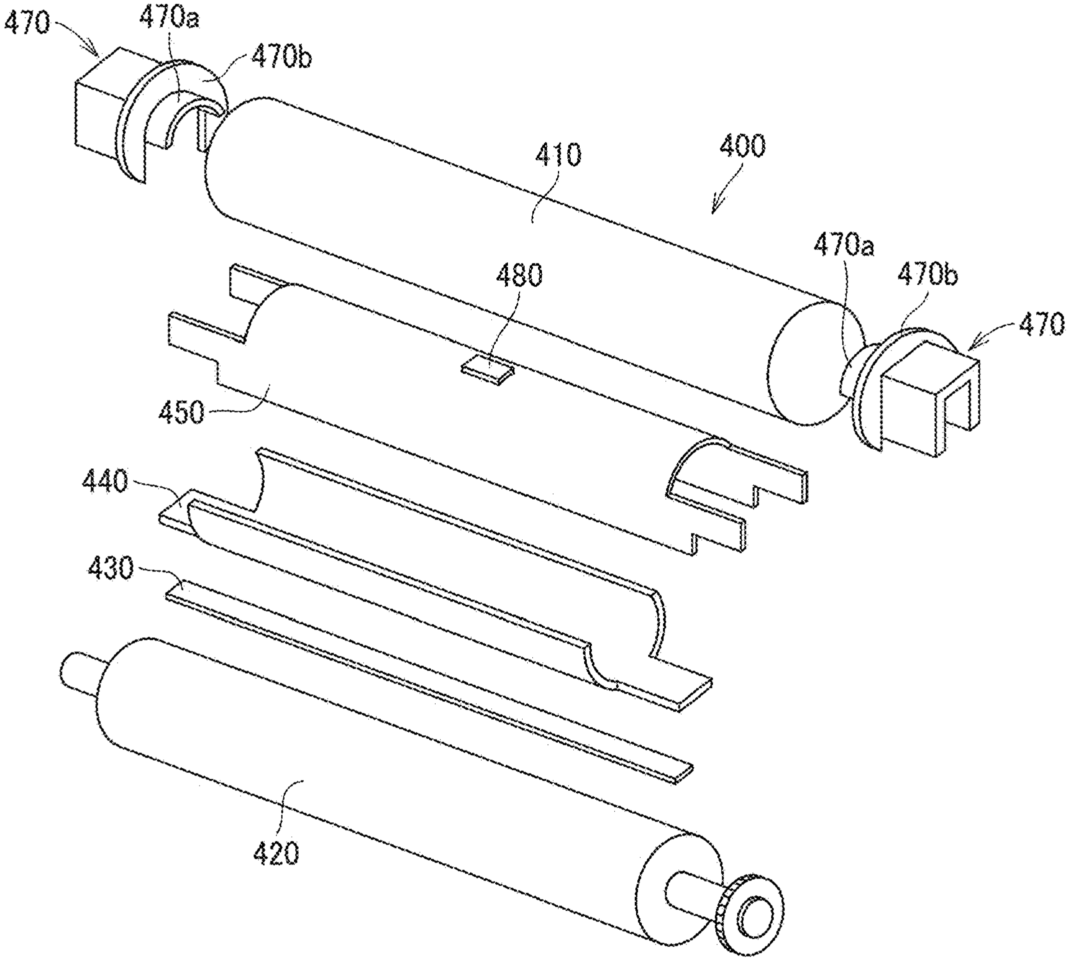
FIG. 8 is an exploded perspective view of the fixing device illustrated in FIG. 7.

A fixing device 400 illustrated in FIGS. 7 and 8 includes a fixing belt 410 as a first rotator, a pressure roller 420 as a second rotator, a heater 430 as a heat source, a heater holder 440 as a heat source holder, a pressure stay 450 as a support, a thermistor 480 as a temperature sensor, and flanges 470 (see FIG. 8) as rotator holders.

Functions and configurations of the fixing belt 410 and the pressure roller 420 illustrated in FIG. 7 are basically the same as those of the fixing belt 21 and the pressure roller 22 illustrated in FIGS. 2A and 2B.

The heater 430 is a ceramic heater including a plate-like substrate and a resistive heat generator disposed on the substrate. Flowing an electric current through the resistive heat generator causes the resistive heat generator to generate heat. The heater 430 is disposed so as to be in contact with the inner circumferential surface of the fixing belt 410, and the heater 430 generates heat to heat the inner circumferential surface of the fixing belt 410. In addition, the heater 430 also functions as a nip formation pad that forms the fixing nip N by sandwiching the fixing belt 410 with the pressure roller 420.

The heater holder 440 is the heat source holder that holds the heater 430. The heater holder 440 is made of, for example, a heat-resistant resin. The heater holder 440 has a half circle cross-sectional shape formed along the inner circumferential surface of the fixing belt 410 to restrict a rotational orbit of the fixing belt 410.

The pressure stay 450 is the support to support the heater holder 440. Since the pressure stay 450 supports the heater holder 440, the pressure stay 450 prevents bending of the heater holder 440 and the heater 430 due to pressure applied by the pressure roller 420 to form the fixing nip N having a uniform width between the pressure roller 420 and the fixing belt 410. The pressure stay 450 is preferably made of metal such as SUS in order to ensure rigidity.

The thermistor 480 as the temperature sensor is disposed on the pressure stay 450. The thermistor 480 faces the inner circumferential surface of the fixing belt 410 in a contact or non-contact manner to detect the temperature of the fixing belt 410.

Similar to the above-described flanges 40, the flanges 470 are a pair of holders holding both ends of the fixing belt 410 in the longitudinal direction of the fixing belt 410. The flange 470 has a backup portion **470*a* as an insertion portion to be inserted into the fixing belt 410 and a flange portion 470*b* as a regulator to regulate the movement of the fixing belt 410 in the longitudinal direction. A biasing member such as a spring presses the flange 470 against the end of the fixing belt 410 to hold the flange 470 inserted into the loop of the fixing belt 410**.

In the fixing device 400 having the above-described configuration, when the heater 430 generates heat, the temperature of the flange 470 increases, and the temperature of the lubricant adhering to the flange 470 increases, which may cause the generation of the fine particles including the ultrafine particles. Accordingly, applying the present embodiments to the fixing device 400 illustrated in FIGS. 7 and 8 also enables preventing the lubricant from moving to the flange to reduce the occurrence of fine particles including ultrafine particles.

Figure 9:
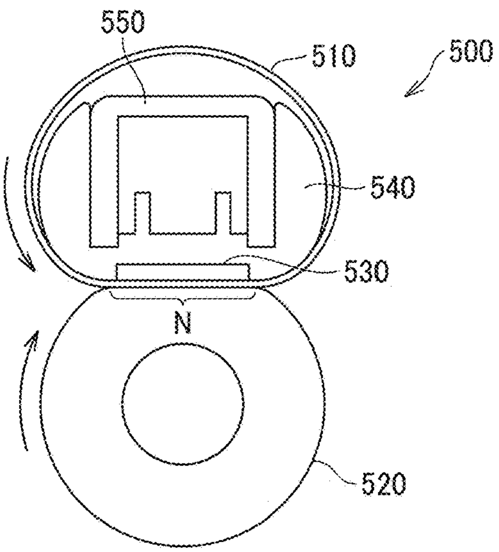
FIG. 9 is a schematic cross-sectional view of a fixing device that is different from the fixing devices of FIGS. 2 and 7 but applicable to the above-described embodiments.
Figure 10:
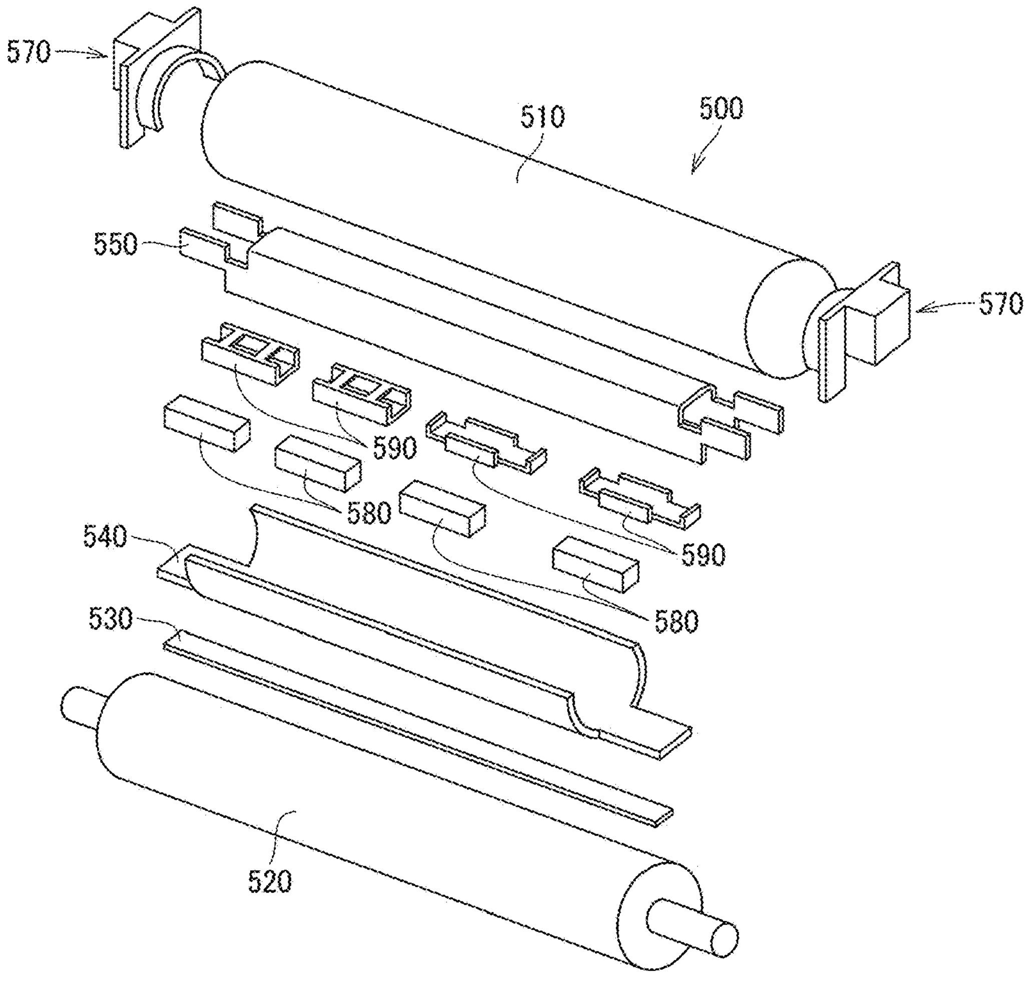
FIG. 10 is an exploded perspective view of the fixing device illustrated in FIG. 9.

Next, a fixing device 500 illustrated in FIGS. 9 and 10 is described. Similar to the fixing device 400 illustrated in FIGS. 7 and 8, the fixing device 500 includes the ceramic heater (that is a heater 530). The fixing device 500 illustrated in FIGS. 9 and 10 includes a fixing belt 510 as the first rotator, a pressure rotator 520 as the second rotator, the heater 530 as the heat source, a heater holder 540 as the heat source holder, a reinforcement 550 as the support, belt holders 570 (see FIG. 10) as the rotator holders, heat-sensitive members 580 (see FIG. 10) as the temperature sensors, and covers 590 (see FIG. 10).

Functions and configurations of the fixing belt 510, the pressure rotator 520, the heater 530, the heater holder 540, the reinforcement 550, and the belt holders 570 illustrated in FIGS. 9 and 10 are basically the same as those of the fixing belt 410, the pressure roller 420, the heater 430, the heater holder 440, the pressure stay 450, and the flanges 470 illustrated in FIGS. 7 and 8.

The heat-sensitive members 580 are disposed on a side of the heater holder 540 that is opposite to a side of the heater holder 540 to hold the heater 530 and detects the temperature of the heater 530 via the heater holder 540. Based on the temperature detected by the heat-sensitive members 580, heat generation of the heater 530 is controlled so that the fixing belt 510 is maintained at a predetermined fixing temperature.

The covers 590 are box-shaped members made of heat-resistant resin. Each cover 590 is disposed so as to face the heater holder 540 via the heat-sensitive member 580 inside the loop of the fixing belt 510 to cover the corresponding heat-sensitive member 580.

As described above, the fixing device to which the present disclosure is applied may include the heat-sensitive member 580 that detects the temperature of the heater 530 and the cover 590 that covers the heat-sensitive member 580.

Figure 11:
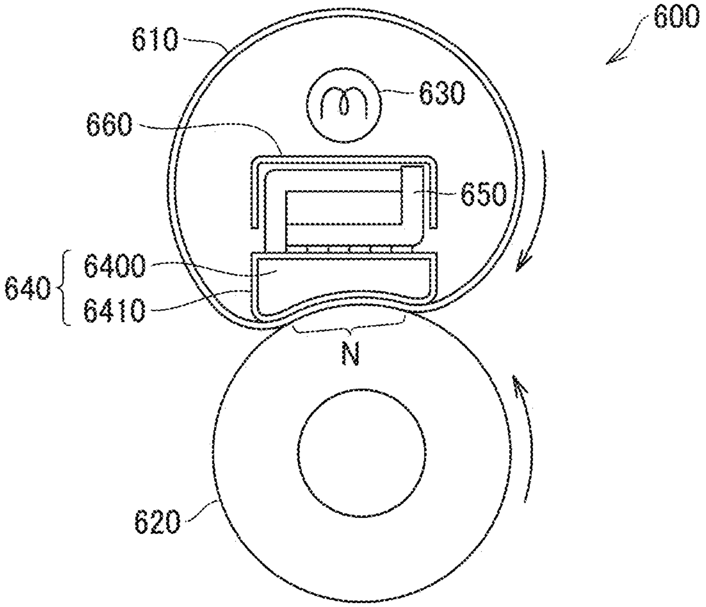
FIG. 11 is a schematic cross-sectional view of a fixing device that is different from the fixing devices of FIGS. 2, 7, and 9 but applicable to the above-described embodiments.
Figure 12:
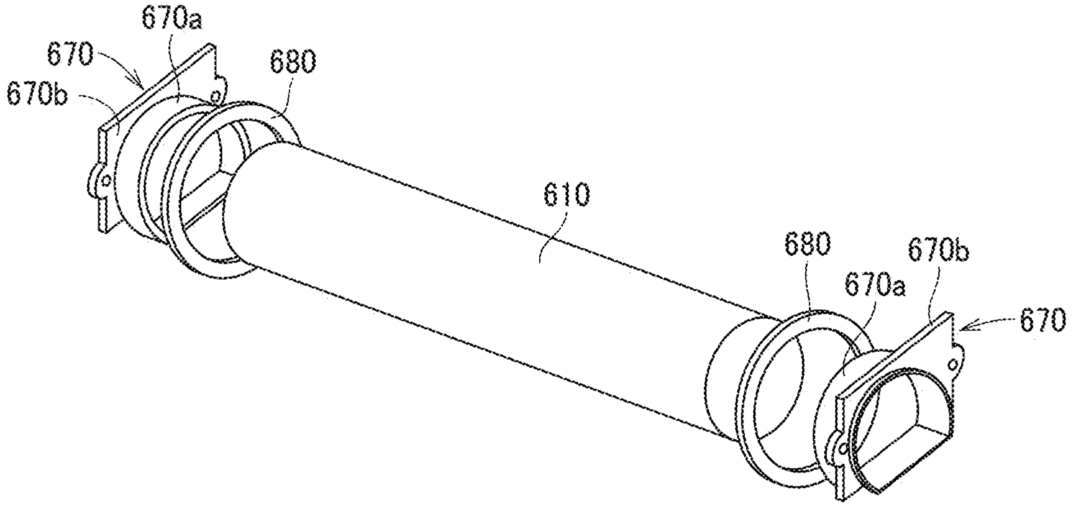
FIG. 12 is an exploded perspective view of the fixing device illustrated in FIG. 11.

Subsequently, a fixing device 600 illustrated in FIGS. 11 and 12 is described. Similar to the fixing device 20 illustrated in FIGS. 2A, 2B, and 3, the fixing device 600 includes the halogen heater (that is a heater 630). Specifically, the fixing device 600 illustrated in FIGS. 11 and 12 includes a fixing belt 610 as the first rotator, a pressure roller 620 as the second rotator, the heater 630 as the heat source, a nip formation pad 640, a support 650 as the support, a reflector 660 as the reflector, retention frames 670 (see FIG. 12) as the rotator holders, and rings 680 (see FIG. 12) as a slide.

Functions and configurations of the fixing belt 610, the pressure roller 620, the heater 630, the nip formation pad 640, the support 650, the reflector 660, and the retention frames 670 illustrated in FIGS. 11 and 12 are basically the same as those of the fixing belt 21, the pressure roller 22, the heater 23, the nip formation pad 24, the stay 25, the reflector 26, and the flanges 40 illustrated in FIGS. 2A, 2B, and 3. The nip formation pad 640 includes a metal base pad 6400 and a fluororesin sliding sheet 6410 that is interposed between the base pad 6400 and an inner circumferential surface of the fixing belt 610.

The ring 680 is mounted on an outer circumferential surface of a cylindrical portion **670*a* as an insertion portion of the retention frame 670 that is inserted into the loop formed by the fixing belt 610. The ring 680 is interposed between a longitudinal edge of the fixing belt 610 and a fixing plate 670*b* as a restraint of the retention frame 670. As the fixing belt 610 rotates, the ring 680 rotates together with the fixing belt 610, or the fixing belt 610 slides over the low-friction ring 680. Thus, the sliding friction that is generated between the fixing belt 610 and the retention frame 670** is reduced.

According to one or more embodiments of the present disclosure, the fixing device may include the rings 680 as described above.

Figure 13:
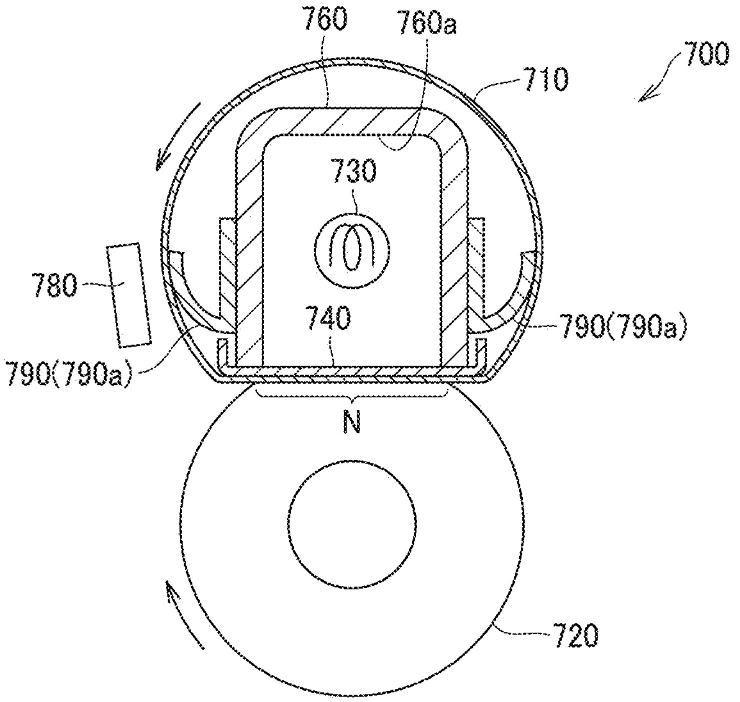
FIG. 13 is a schematic cross-sectional view of a fixing device that is different from the fixing devices of FIGS. 2, 7, 9, and 11 but applicable to the above-described embodiments.
Figure 14:
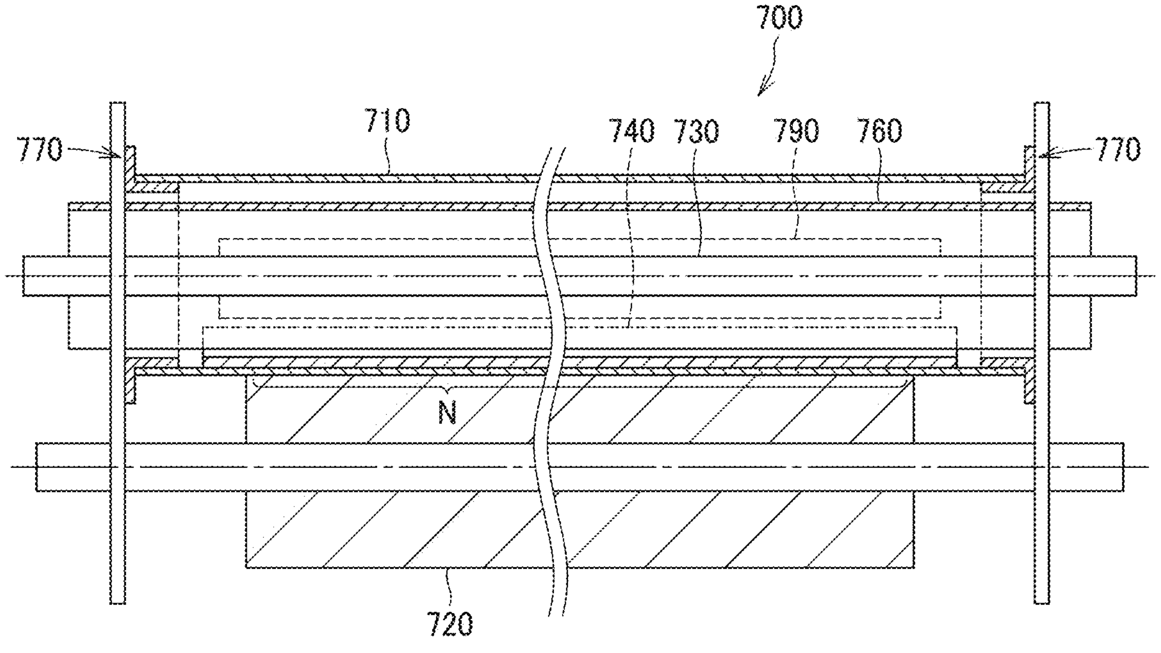
FIG. 14 is a cross-sectional view of the fixing device illustrated in FIG. 13, taken along a longitudinal direction of a fixing belt included in the fixing device.

Subsequently, a fixing device 700 illustrated in FIGS. 13 and 14 is described. Similar to the fixing device 20 illustrated in FIGS. 2A, 2B, and 3, the fixing device 700 includes the halogen heater that is a heater 730 as the heat source. Specifically, the fixing device 700 illustrated in FIGS. 13 and 14 includes a fixing belt 710 as the first rotator, a pressure roller 720 as the second rotator, a halogen heater 730 as the heat source, a nip formation pad 740, a reflector 760, belt supports 770 (see FIG. 14) as the rotator holders, a temperature sensor 780 as the temperature sensor, and guides 790.

The fixing belt 710, the pressure roller 720, the halogen heater 730, the nip formation pad 740, the reflector 760, the belt supports 770, and the temperature sensor 780 that are illustrated in FIGS. 13 and 14 are basically the same in function as the fixing belt 21, the pressure roller 22, the heater 23, the nip formation pad 24, the reflector 26, the flanges 40, and the temperature sensor 28, respectively, illustrated in FIGS. 2A, 2B, and 3.

However, the reflector 760 illustrated in FIGS. 13 and 14 reflects the radiant heat (infrared rays) emitted from the halogen heater 730 mainly to the nip formation pad 740, not to the fixing belt 710. The reflector 760 has a U-shaped cross-section to cover the outside of the halogen heater 730. The reflector 760 has an inner face 760*a* facing the halogen heater 730 and serving as a reflecting surface having a relatively high reflectance. The inner face 760*a* as the reflecting surface of the reflector 760 reflects the radiant heat emitted from the halogen heater 730 to the nip formation pad 740.

As a result, the nip formation pad 740 is heated by the radiant heat emitted from the halogen heater 730 toward the nip formation pad 740 and the radiant heat reflected by the reflector 760 to the nip formation pad 740. The heat is conducted from the nip formation pad 740 to the fixing belt 710 at the fixing nip N.

In this case, the nip formation pad 740 that forms the nip N functions as a heat conductor that conducts heat to the fixing belt 710 at the fixing nip N. To conduct heat, the nip formation pad 740 is made of metal having good thermal conductivity such as copper or aluminum.

The reflector 760 also functions as a support (in other words, a stay) that supports the nip formation pad 740. Since the reflector 760 supports the nip formation pad 740 throughout the length of the fixing belt 710, the reflector 760 prevents the nip formation pad 740 from bending to form the fixing nip N having a uniform width between the fixing belt 710 and the pressure roller 720. The reflector 760 is preferably made of metal having relatively high rigidity such as SUS or Steel Electrolytic Cold Commercial (SECC) to ensure the function as the support.

The guides 790 are disposed inside the loop of the fixing belt 710 to guide the inner circumferential surface of the fixing belt 710 rotating. Each of the guides 790 has a guide face 790*a* curving along the inner circumferential surface of the fixing belt 710. As the fixing belt 710 is guided along the guide face 790*a*, the fixing belt 710 smoothly rotates without being largely deformed.

According to one or more embodiments of the present disclosure, the fixing device may conduct heat from the halogen heater 730 via the nip formation pad 740 having good thermal conductivity to heat the fixing belt 710 as described above.

Figure 15:
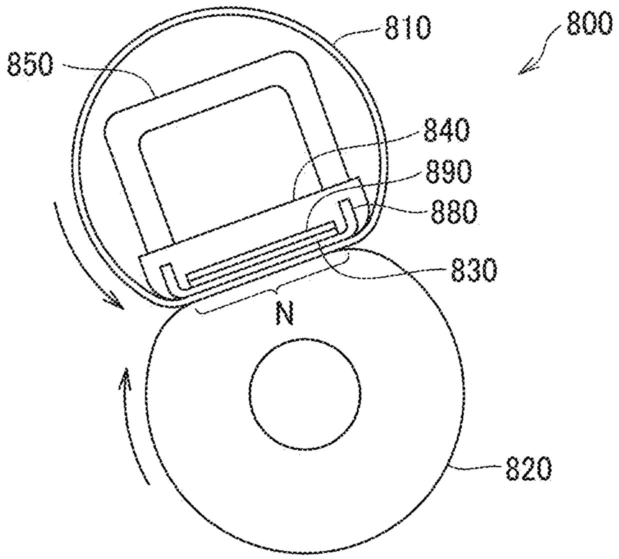
FIG. 15 is a schematic cross-sectional view of a fixing device that is different from the fixing devices of FIGS. 2, 7, 9, 11, and 13 but applicable to the above-described embodiments.
Figure 16:
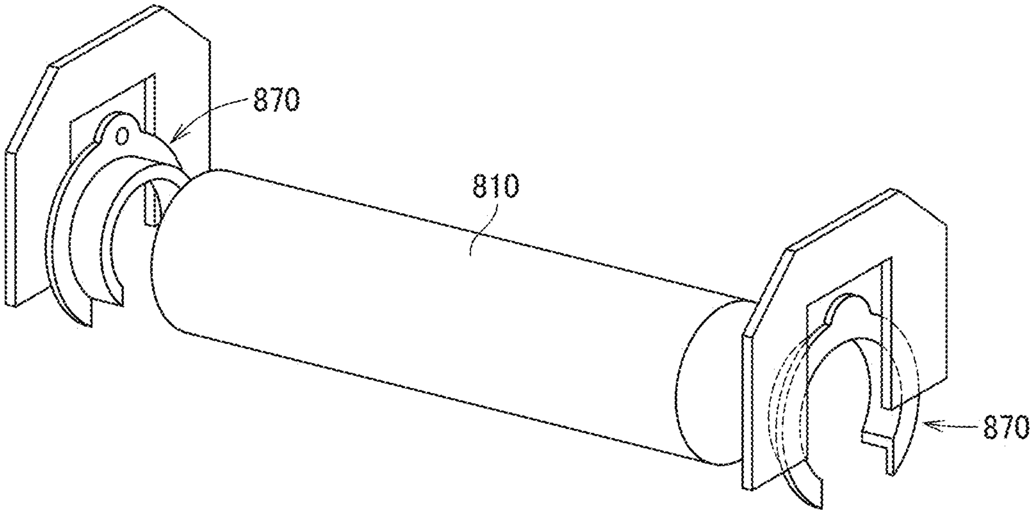
FIG. 16 is an exploded perspective view of the fixing device illustrated in FIG. 15.

Subsequently, a fixing device 800 illustrated in FIGS. 15 and 16 is described. Similar to the fixing device 400 illustrated in FIGS. 7 and 8, the fixing device 800 includes the ceramic heater (that is a heater 830). The fixing device 800 illustrated in FIGS. 15 and 16 includes a fixing belt 810 as the first rotator, a pressure roller 820 as the second rotator, the heater 830 as the heat source, a holder 840 as the heat source holder, a stay 850 as the support, arc-shaped guides 870 (see FIG. 16) as the rotator holders, a heat diffuser 880 as a heat conductor, and a heat retaining plate 890 as a heat insulator.

Functions of the fixing belt 810, the pressure roller 820, the heater 830, the holder 840, the stay 850, and the arc-shaped guides 870 illustrated in FIGS. 15 and 16 are basically the same as the functions of the fixing belt 410, the pressure roller 420, the heater 430, the heater holder 440, the pressure stay 450, and the flanges 470 illustrated in FIGS. 7 and 8, respectively. In addition to the heater 830, the holder 840 holds the heat diffuser 880 and the heat retaining plate 890 that are overlaid.

The heat diffuser 880 is made of metal such as stainless steel, aluminum alloy, or iron. The heat diffuser 880 is disposed so as to be in contact with the inner circumferential surface of the fixing belt 810, transmits heat generated by the heater 830 to the fixing belt 810, and is in contact with the pressure roller 820 via the fixing belt 810 to form the fixing nip N.

Thermal conductive grease is applied between the heater 830 and the heat diffuser 880 to improve heat transfer efficiency from the heater 830 to the heat diffuser 880. On the other hand, the heat retaining plate 890 is disposed on a side of the heater 830 that is opposite to a side of the heater 830 facing the heat diffuser 880 to prevent the heat of the heater 830 from being transmitted to the holder 840 and the stay 850.

Since the fixing belt 810 rotates and slides on the heat diffuser 880, lubricant is applied between the fixing belt 810 and the heat diffuser 880 to improve sliding performance. A slide surface of the heat diffuser 880 in contact with the fixing belt 810 is formed with a surface layer such as a glass coating layer or a hard chromium plating layer each having low friction and wear resistance.

In the fixing device 800 having the above-described configuration, when the heater 830 generates heat, the temperature of the arc-shaped guide 870 increases, and the temperature of the lubricant adhering to the arc-shaped guide 870 increases, which may cause the generation of the fine particles including the ultrafine particles. Therefore, applying present embodiments can prevent the occurrence of the fine particles including the ultrafine particles.

Figure 17:
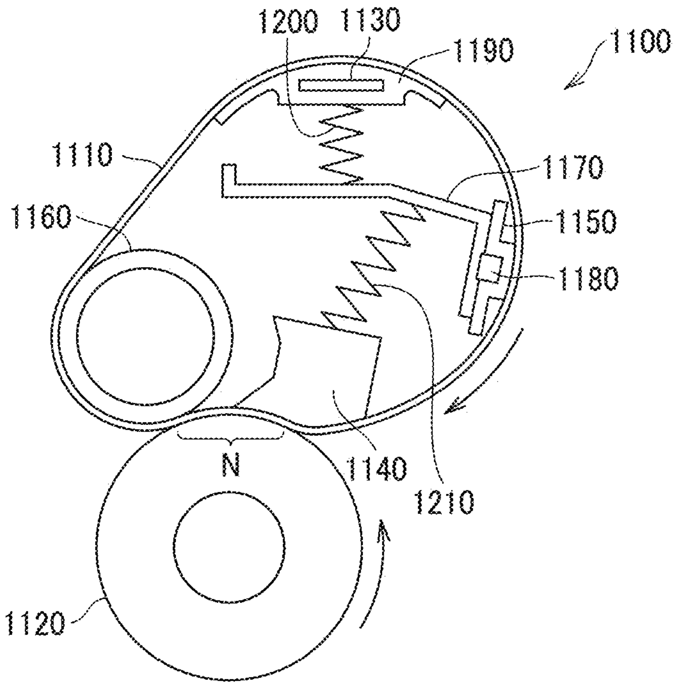
FIG. 17 is a schematic cross-sectional view of a fixing device that is different from the fixing devices of FIGS. 2, 7, 9, 11, 13, and 15 but applicable to the above-described embodiments.
Figure 18:
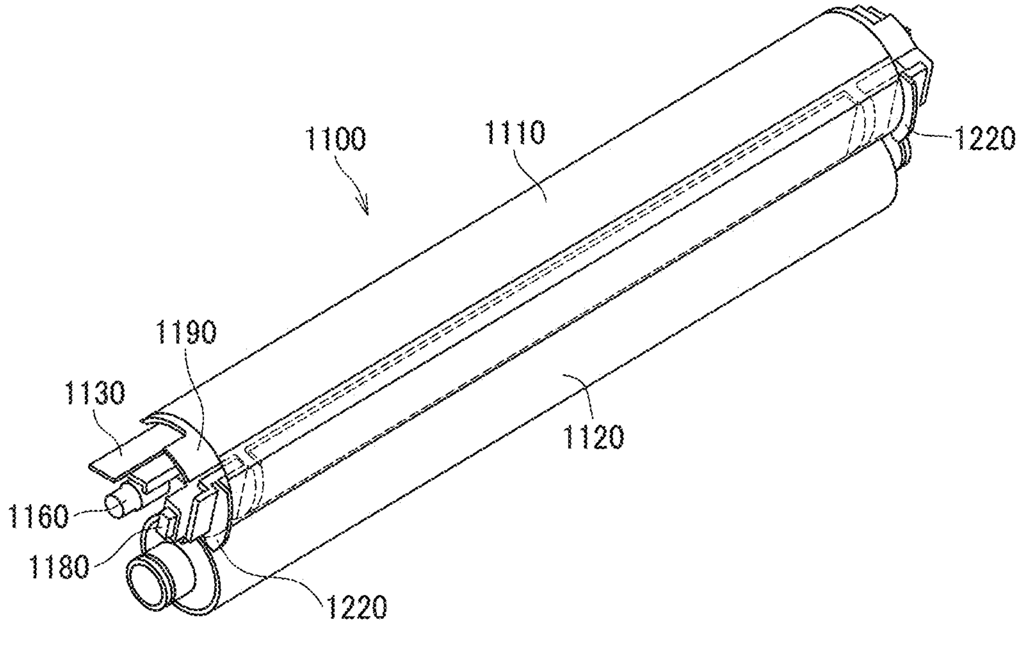
FIG. 18 is a perspective view of a part of the fixing device illustrated in FIG. 17.

The embodiments of the present disclosure are applicable to a fixing device 1100 illustrated in FIGS. 17 and 18.

The fixing device 1100 illustrated in FIGS. 17 and 18 includes a fixing belt 1110 as the first rotator, a fixing roller 1160, a pressure roller 1120 as the second rotator, a heater 1130 as the heat source, a pressing pad 1140 as the nip formation pad, a guide 1150, a support 1170, a temperature sensor 1180 as the temperature sensor, a heat transferor 1190, and belt holders 1220 (see FIG. 18) as the rotator holders.

The fixing belt 1110 illustrated in FIG. 17 is wound around the fixing roller 1160, the pressing pad 1140, the guide 1150, and the heat transferor 1190. The fixing roller 1160 is rotated by the rotation of the pressure roller 1120.

The heater 1130 is a planar heater or a plate-shaped heater such as a ceramic heater and disposed in the heat transferor 1190. The heat transferor 1190 is interposed between the heater 1130 and the fixing belt 1110 to transfer the heat of the heater 1130 to the fixing belt 1110. A spring 1200 attached to the support 1170 biases the heat transferor 1190 against the fixing belt 1110 so that the heat transferor 1190 comes into contact with the inner circumferential surface of the fixing belt 1110.

Another spring 1210 attached to the support 1170 biases the pressing pad 1140 against the fixing belt 1110 so that the pressing pad 1140 comes into contact with the inner circumferential surface of the fixing belt 1110. As a result, the pressing pad 1140 is pressed against the pressure roller 1120 via the fixing belt 1110 to form the nip N between the fixing belt 1110 and the pressure roller 1120.

The guide 1150 is attached to and supported by the support 1170. A temperature sensor 1180 is attached to the guide 1150 and detects the temperature of the fixing belt 1110.

Since the fixing device 1100 as illustrated in FIG. 17 also includes the belt holders 1220 that hold both ends of the fixing belt 1110 in the longitudinal direction, heating the fixing belt 1110 increases the temperature of the lubricant adhering to the belt holders 1220, which may cause the occurrence of fine particles including the ultrafine particles. Accordingly, applying the present embodiments of the present disclosure to the above-described fixing device 1100 can also effectively prevent the occurrence of the fine particles including the ultrafine particles similar to the above-described embodiments.

The above-described embodiments are illustrative and do not limit this disclosure. It is therefore to be understood that within the scope of the appended claims, numerous additional modifications and variations are possible to this disclosure otherwise than as specifically described herein. For example, the image forming apparatus to which the features of this disclosure are applied is not limited to the printer illustrated in FIG. 1 but may be other types of printers, copiers, facsimile machines, or multifunction machines having these capabilities.

The following describes preferred aspects of the present disclosure.

First Aspect

In a first aspect, a fixing device includes a rotator, a heater, a rotator support, a nip formation pad, lubricant, and a pressure rotator. The heater heats an inner circumferential surface of the rotator. The rotator support supports an end of the inner circumferential surface of the rotator in an axial direction of the rotator. The rotator slides on the rotator support. The nip formation pad is in contact with the inner circumferential surface of the rotator. One end of the nip formation pad in a longitudinal direction of the nip formation pad is separated from the rotator support with a clearance of 2 mm or more. The lubricant is between the rotator and the nip formation pad. The pressure rotator presses the nip formation pad via the rotator to form a nip between the rotator and the pressure rotator.

Second Aspect

In a second aspect, the fixing device according to the first aspect further includes a flow preventer in contact with the inner circumferential surface of the rotator between the nip formation pad and the rotator support that form the clearance.

Third Aspect

In a third aspect, the fixing device according to the first aspect further includes a lubricant absorber in contact with the inner circumferential surface of the rotator between the nip formation pad and the rotator support that form the clearance.

Fourth Aspect

In a fourth aspect, the fixing device according to any one of the first to third aspects further includes a sliding sheet impregnated with lubricant. The sliding sheet is disposed between the nip formation pad and the rotator.

Fifth Aspect

In a fifth aspect, the nip formation pad in the fixing device according to any one of the first to fourth aspects has a space between the rotator and the nip formation pad to store lubricant.

Sixth Aspect

In a sixth aspect, an image forming apparatus includes the fixing device according to any one of the first to fifth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A fixing device comprising:
- a rotator configured to rotate;
- a heater configured to heat an inner circumferential surface of the rotator;
- a rotator support including a base portion and a cylindrical wall extending from the base portion, the cylindrical wall supporting a first end of the inner circumferential surface of the rotator extending from a nip in a longitudinal direction of a nip formation pad, and supporting a second end of the inner circumferential surface of the rotator facing the first end, the base portion defining a base opening, and the cylindrical wall defining an extension opening;
- the nip formation pad in contact with the inner circumferential surface of the rotator, the nip formation pad having one end in a longitudinal direction of the nip formation pad, the one end laterally separated from the first end of the rotator support contacting the inner circumferential surface of the rotator with a clearance of 2 mm or more;
- lubricant between the rotator and the nip formation pad;
- a pressure rotator configured to press the nip formation pad via the rotator to form a nip between the rotator and the pressure rotator; and
- a flower preventer in contact with the inner circumferential surface of the rotator at a same level as the cylindrical wall contacting the inner circumferential surface of the rotator, the flower preventer separated from and between the nip formation pad and the rotator support that form the clearance forming a lubricant gap exposing the inner circumferential surface of the rotator between the flower preventer and the nip formation pad,
- the cylindrical wall having a side surface facing the nip formation pad.

2. The fixing device according to claim 1,
- wherein the flow preventer has an O-shape in an axial direction along the inner circumferential surface of the rotator.

3. The fixing device according to claim 1, further comprising
- a lubricant absorber in contact with the inner circumferential surface of the rotator between the nip formation pad and the rotator support that form the clearance, the lubricant absorber om the nip formation pad.

4. The fixing device according to claim 1, further comprising
- a sliding sheet impregnated with lubricant and disposed between the nip formation pad and the rotator.

5. The fixing device according to claim 1,
- wherein the nip formation pad has a space between the rotator and the nip formation pad to store lubricant.

6. The fixing device according to claim 5, wherein
the nip formation pad includes a groove,
the groove and the rotator cooperatively define the space, and
the space is a closed space configured to prevent lubricant from moving outside of the nip formation pad in an axial direction.

7. An image forming apparatus comprising the fixing device according to claim 1.

8. The fixing device according to claim 1,
wherein the rotator support includes a portion having an outer circumference equal to an inner circumference of the inner circumferential surface of the rotator.

* * * * *